(12) United States Patent
Odani et al.

(10) Patent No.: US 11,264,634 B2
(45) Date of Patent: Mar. 1, 2022

(54) BATTERY, BATTERY PACK, ELECTRONIC DEVICE, ELECTRIC VEHICLE, ELECTRIC STORAGE DEVICE, AND ELECTRIC POWER SYSTEM

(71) Applicant: MURATA MANUFACTURING CO., LTD., Kyoto (JP)

(72) Inventors: Toru Odani, Tokyo (JP); Tadahiko Kubota, Tokyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 182 days.

(21) Appl. No.: 15/945,223

(22) Filed: Apr. 4, 2018

(65) Prior Publication Data

US 2018/0226675 A1 Aug. 9, 2018

Related U.S. Application Data

(63) Continuation of application No. PCT/JP2016/003829, filed on Aug. 23, 2016.

(30) Foreign Application Priority Data

Oct. 8, 2015 (JP) .............................. JP2015-200395

(51) Int. Cl.
*H01M 10/0567* (2010.01)
*H01M 10/0569* (2010.01)
(Continued)

(52) U.S. Cl.
CPC ..... *H01M 10/0431* (2013.01); *H01M 10/052* (2013.01); *H01M 10/058* (2013.01);
(Continued)

(58) Field of Classification Search
None
See application file for complete search history.

(56) References Cited

U.S. PATENT DOCUMENTS

2003/0108787 A1* 6/2003 Endo ..................... H01M 4/622
429/94
2004/0106037 A1* 6/2004 Cho .................... H01M 10/052
429/144
(Continued)

FOREIGN PATENT DOCUMENTS

CN 102376971 3/2012
CN 103811727 5/2014
(Continued)

OTHER PUBLICATIONS

Machine translation of Zhang et al., CN 104124469 A.*
(Continued)

*Primary Examiner* — Haixia Zhang
(74) *Attorney, Agent, or Firm* — K&L Gates LLP

(57) ABSTRACT

A battery is provided. The battery includes an electrode group including a positive electrode and a negative electrode, and an electrolyte including an electrolytic solution. The electrode group includes an insulating layer having an insulating material, and the electrolytic solution includes a nonaqueous solvent containing propylene carbonate in an amount of 5% by mass or more and an additive including one or more predetermined compounds.

22 Claims, 7 Drawing Sheets

(51) Int. Cl.
*H01M 10/04* (2006.01)
*H01M 10/0565* (2010.01)
*H01M 10/058* (2010.01)
*H01M 10/39* (2006.01)
*H01M 50/20* (2021.01)
*H01M 10/052* (2010.01)

(52) U.S. Cl.
CPC ... *H01M 10/0565* (2013.01); *H01M 10/0567* (2013.01); *H01M 10/0569* (2013.01); *H01M 10/39* (2013.01); *H01M 50/20* (2021.01); *Y02E 60/10* (2013.01); *Y02T 10/70* (2013.01)

(56) References Cited

U.S. PATENT DOCUMENTS

| | | | |
|---|---|---|---|
| 2005/0221192 A1* | 10/2005 | Hennige | H01M 4/0471 429/246 |
| 2007/0080662 A1* | 4/2007 | Wu | B60L 3/0046 320/110 |
| 2010/0164436 A1 | 7/2010 | Lampe-Onnerud et al. | |
| 2014/0239903 A1 | 8/2014 | Choi | |
| 2016/0126592 A1* | 5/2016 | Saito | H01M 10/0569 429/338 |

FOREIGN PATENT DOCUMENTS

| | | | |
|---|---|---|---|
| CN | 104124469 A | * | 10/2014 |
| JP | 2007-172990 A | | 7/2007 |
| KR | 10-2016-0063187 A | | 6/2016 |
| WO | 2014/125946 A1 | | 8/2014 |

OTHER PUBLICATIONS

Japanese Office Action dated Jul. 24, 2018 in corresponding Japanese Application No. 2015-200395.
Korean Office Action dated Jun. 14, 2019 in corresponding Korean Application No. 10-2018-7009666.
European Search Report dated Mar. 1, 2019 in corresponding European Application No. 16853223.2.
International Search Report issued in connection with International Patent Application No. PCT/JP2016/003829, dated Oct. 18, 2016. (4 pages).
Written Opinion issued in connection with International Patent Application No. PCT/JP2016/003829, dated Oct. 18, 2016. (4 pages).
Chinese Office Action dated Jun. 22, 2020 in corresponding Chinese Application No. 201680058231.5.
Chinese Office Action dated May 14, 2021 in corresponding Chinese Application No. 201680058231.5.
Chinese Office Action dated Jan. 14, 2021 in corresponding Chinese Application No. 201680058231.5.

* cited by examiner

BATTERY, BATTERY PACK, ELECTRONIC DEVICE, ELECTRIC VEHICLE, ELECTRIC STORAGE DEVICE, AND ELECTRIC POWER SYSTEM

CROSS REFERENCE TO RELATED APPLICATIONS

The present application is a continuation of PCT patent application no. PCT/JP2016/003829, filed on Aug. 23, 2016, which claims priority to Japanese patent application no. JP2015-200395 filed on Oct. 8, 2015, the entire contents of which are being incorporated herein by reference.

BACKGROUND

The present technology generally relates to a battery, a battery pack, an electronic device, an electric vehicle, an electric storage device, and an electric power system.

Recent electronic devices and the like tend to have higher performance and multifunctionality more and more. Various configurations are adopted in order to improve characteristics of batteries applied to electronic devices and the like.

For example, improvements have been made by disposing insulating materials such as alumina in layers between positive and negative electrodes of the battery and by adding an additive to an electrolytic solution.

SUMMARY

The present technology generally relates to a battery, a battery pack, an electronic device, an electric vehicle, an electric storage device, and an electric power system.

According to an embodiment of the present technology, a battery is provided. The battery includes an electrode group including a positive electrode and a negative electrode, and an electrolyte including an electrolytic solution, wherein the electrode group includes an insulating layer having an insulating material, and the electrolytic solution includes a nonaqueous solvent including propylene carbonate in an amount of 5% by mass or more and an additive including one or more compounds represented by one or both of a chemical formula (1) and a chemical formula (2).

[Chemical Formula 1]

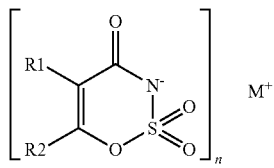
(1)

In the above formula, R1 and R2 each independently represent a hydrogen group, an alkyl group, an alkenyl group or an alkynyl group optionally having a substituent and having 1 to 4 carbon atoms, n is an integer of 1 to 3, and M is a metal ion.

[Chemical Formula 2]

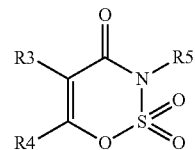
(2)

In the above formula, R3, R4 and R5 each independently represent a hydrogen group, an alkyl group, an alkenyl group or an alkynyl group optionally having a substituent and having 1 to 4 carbon atoms.

According to another embodiment of the present technology, a battery is provided. The battery includes an electrode group including a positive electrode and a negative electrode, and an electrolyte including an electrolytic solution, a polymer compound configured to hold the electrolytic solution and an insulating material, wherein the electrolytic solution includes a nonaqueous solvent including propylene carbonate in an amount of 5% by mass or more and an additive including one or more compounds represented by one or both of a chemical formula (1) and a chemical formula (2).

[Chemical Formula 1]

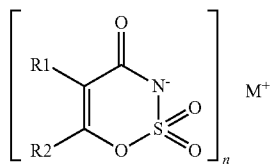
(1)

In the above formula, R1 and R2 each independently represent a hydrogen group, an alkyl group, an alkenyl group or an alkynyl group and having 1 to 4 carbon atoms, n is an integer of 1 to 3, and M is a metal ion.

[Chemical Formula 2]

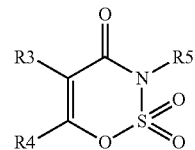
(2)

In the above formula, R3, R4 and R5 each independently represent a hydrogen group, an alkyl group, an alkenyl group or an alkynyl group and having 1 to 4 carbon atoms.

The battery pack, the electronic device, the electric vehicle, the electric storage device, and the electric power system of the present technology are provided with the battery according to some embodiments of the present disclosure.

According to an embodiment of the present disclosure, it is possible to improve high-temperature cycle characteristics by having an insulating layer and using a predetermined electrolytic solution. Similar effects can be achieved in the battery pack, the electronic device, the electric vehicle, the electric storage device, and the electric power system of the present technology using the battery according to an embodiment. It should be understood that the present technology is not limited to improve high-temperature cycle characteristics and that other suitable properties relating to the present technology may be realized and as further described herein.

DETAILED DESCRIPTION

The present technology generally relates to a battery, a battery pack, an electronic device, an electric vehicle, an electric storage device, and an electric power system. The present disclosure will be described based on examples with reference to the drawings, but the present disclosure is not to be considered limited to the examples, and various numerical values and materials in the examples are considered by way of example.

According to an embodiment of the present technology, a cylindrical nonaqueous electrolyte secondary battery (hereinafter, referred to as "nonaqueous electrolyte battery" or simply "battery") will be described with reference to FIG. 1 and FIG. 2 as an example.

Figure 1:
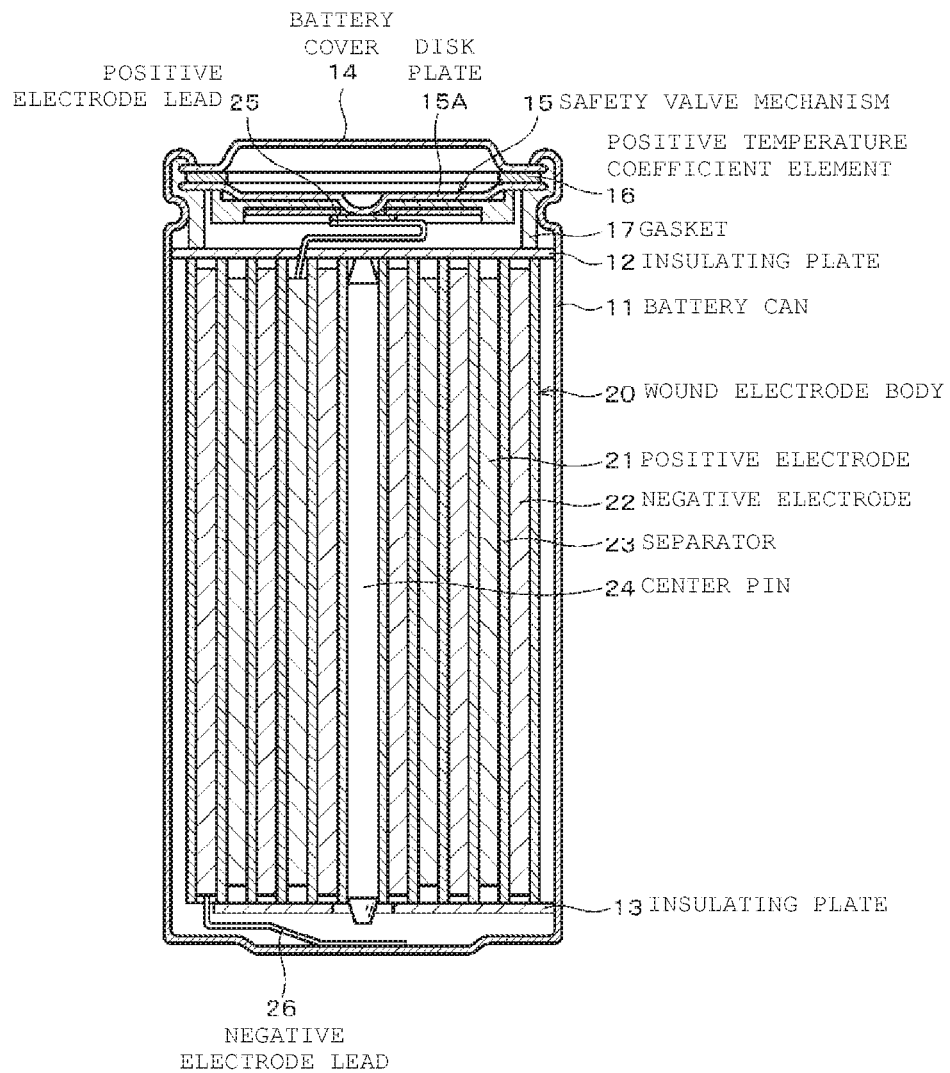
FIG. 1 is a cross-sectional view illustrating a configuration of a battery according to an embodiment of the present technology.
Figure 2:
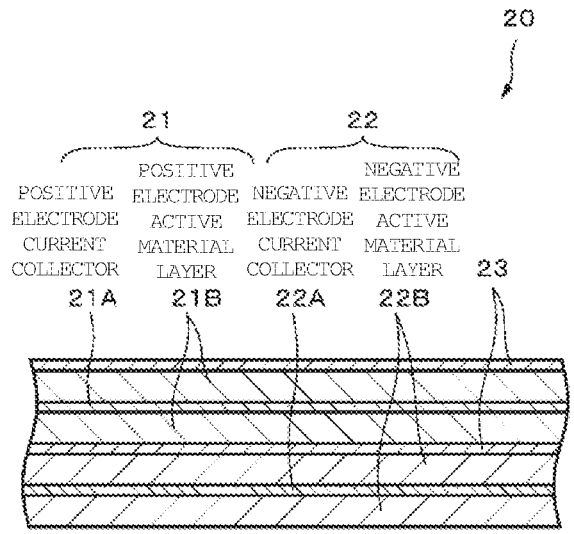
FIG. 2 is an enlarged cross-sectional view illustrating a portion of a wound electrode body shown in FIG. 1 according to an embodiment.

As shown in FIG. 1, the nonaqueous electrolyte battery may include a wound electrode body 20 and a pair of insulating plates 12, 13 housed in a substantially hollow cylindrical battery can 11. A battery structure using such a battery can 11 is called a cylindrical type.

The battery can 11 has, for example, a hollow structure in which one end portion is closed and the other end portion is open, and is made of iron (Fe), aluminum (Al), an alloy thereof, or the like. In the case where the battery can 11 is made of iron, for example, nickel (Ni) or the like may be plated on the surface of the battery can 11. The pair of insulating plates 12, 13 sandwich the wound electrode body 20 from above and below and are disposed so as to extend perpendicularly to the peripheral surface of the wound electrode body.

A battery cover 14, a safety valve mechanism 15, and a positive temperature coefficient element (PTC element) 16 are crimped at the open end of the battery can 11 with a gasket 17 interposed among them, and the battery can 11 is hermetically sealed. The battery cover 14 includes, for example, the same material as the battery can 11. The safety valve mechanism 15 and the positive temperature coefficient element 16 are provided inside the battery cover 14.

The safety valve mechanism 15 is electrically connected to the battery cover 14 with the positive temperature coefficient element 16 interposed therebetween. In the safety valve mechanism 15, when the internal pressure becomes equal to or higher than a certain level due to internal short-circuit, heating from the outside or the like, a disk plate 15A is configured to be reversed to cut electrical connection between the battery cover 14 and the wound electrode body 20.

The positive temperature coefficient element 16 prevents abnormal heat generation due to a large current by increasing the resistance (by limiting the current) according to the increase in temperature. The gasket 17 includes, for example, an insulating material, and, for example, asphalt is applied onto the surface of the gasket 17.

The wound electrode body 20 is an electrode group in which a positive electrode 21 and a negative electrode 22 are laminated and wound with a separator 23 interposed therebetween. A center pin 24 may be inserted in the center of the wound electrode body 20.

A positive electrode lead 25 is connected to the positive electrode 21 of the wound electrode body 20 and a negative electrode lead 26 is connected to the negative electrode 22. The positive electrode lead 25 is welded to the safety valve mechanism 15 to be electrically connected to the battery cover 14, and the negative electrode lead 26 is welded to the battery can 11 to be electrically connected to the battery can 11.

The positive electrode lead 25 is, for example, a thin plate-shaped conductive member, and is made of, for example, aluminum or the like. The negative electrode lead 26 is, for example, a thin plate-shaped conductive member and includes copper (Cu), nickel, stainless steel (SUS) or the like.

The positive electrode 21 includes, for example, one in which a positive electrode active material layer 21B is provided on both surfaces of a positive electrode current collector 21A. The positive electrode 21 may have a region in which the positive electrode active material layer 21B is provided only on one surface of the positive electrode current collector 21A according to an embodiment.

As the positive electrode current collector 21A, for example, a metal foil such as an aluminum foil, a nickel foil, or a stainless steel foil can be used.

The positive electrode active material layer 21B includes a positive electrode active material. The positive electrode active material layer 21B may contain other materials such as a conductive agent and a binder.

As the positive electrode active material, for example, a material capable of absorbing and releasing lithium can be used. As the positive electrode active material, for example, a lithium-containing compound can be used.

Examples of the lithium-containing compound include a composite oxide containing lithium and a transition metal element (referred to as "lithium transition metal composite oxide"), a phosphate compound containing lithium and a transition metal element ("lithium transition metal phosphate compound") and the like. As the lithium-containing compound, those containing at least one of cobalt (Co), nickel, manganese (Mn), and iron as transition metal elements are preferred. The reason for this is that a higher voltage can be attained.

Examples of the lithium transition metal composite oxide include a lithium transition metal composite oxide having a layered rock salt structure, and a lithium transition metal composite oxide having a spinel structure.

Examples of the lithium transition metal composite oxide having a layered rock salt structure include lithium-containing compounds represented by the general formula $Li_xM1O_2$ (in the formula, M1 represents an element including one or more transition metal elements, the value of x is $0.05 \leq x \leq 1.10$ as an example, and the value of x varies depending on a charge-discharge state of the battery and is not limited thereto), and the like. More specific examples include a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ (0<z<1)), a lithium nickel cobalt manganese composite ($Li_xNi_{(1-v-w)}Co_vMn_wO_2$ (0<v+w<1, v>0, w>0)), a lithium cobalt aluminum magnesium composite oxide ($Li_xCo_{(1-p-q)}Al_pMg_qO_2$ (0<p+q<1, p>0, q>0)), and the like.

Examples of the lithium transition metal composite oxide having a spinel structure include lithium manganese composite oxide ($LiMn_2O_4$), lithium manganese nickel composite oxide ($Li_xMn_{2-t}Ni_tO_4$ (0<t<2)), and the like.

Examples of the lithium transition metal phosphate compound include a lithium transition metal phosphate compound having an olivine structure and the like.

Examples of the lithium transition metal phosphate compound having an olivine structure include lithium-containing compounds represented by the general formula $Li_yM2PO_4$ (in the formula, M2 represents an element including one or more transition metal elements, the value of y is $0.05 \leq y \leq 1.10$ as an example, and the value of y varies depending on a charge-discharge state of the battery and is not limited to this range), and the like. More specific examples include a lithium iron phosphate compound ($Li_yFePO_4$), a lithium iron manganese phosphate compound ($Li_yFe_{1-u}Mn_uPO_4$ (0<u<1)), and the like.

Coated particles having particles of the above-mentioned lithium-containing compound and a coating layer provided on at least a part of the surface of the particles of the lithium-containing compound may be used as the positive electrode active material. By using such coated particles, battery characteristics can be more improved.

The coating layer is provided on at least a part of the surface of the particle (base material particle) of the lithium-containing compound to be the base material, and has a composition element or composition ratio different from that of the base material particle. Examples of a material of the covering layer include those containing an oxide, a transition metal compound or the like. Specific examples of the material of the coating layer include oxides containing lithium and at least one of nickel and manganese, and compounds containing at least one selected from the group consisting of nickel, cobalt, manganese, iron, aluminum, magnesium (Mg), and zinc (Zn), oxygen (O) and phosphorus (P), and the like. The coating layer may contain a halide such as lithium fluoride or a chalcogenide other than oxygen.

The presence of the coating layer can be confirmed by examining the concentration change of the constituent elements from the surface of the positive electrode active material to the inside. For example, the concentration change can be obtained by scraping particles of the lithium-containing compound provided with the coating layer by sputtering or the like and measuring the composition thereof by Auger Electron Spectroscopy (AES) or Secondary Ion Mass Spectrometry (SIMS)). It is also possible to dissolve the particles of the lithium-containing compound provided with the coating layer slowly in an acidic solution or the like and to measure the time change of the elution by inductively coupled plasma (ICP) spectroscopy or the like.

Besides, as the positive electrode active material, for example, an oxide, a disulfide, a chalcogenide not containing lithium (in particular, a layered compound or a spinel type compound), a conductive polymer or the like can be used. Examples of the oxide include vanadium oxide ($V_2O_5$), titanium dioxide ($TiO_2$), manganese dioxide ($MnO_2$), and the like. Examples of the disulfide include iron disulfide ($FeS_2$), titanium disulfide ($TiS_2$), molybdenum disulfide ($MoS_2$), and the like. Examples of the chalcogenide not containing lithium include niobium diselenide ($NbSe_2$) and the like. Examples of the conductive polymer include sulfur, polyaniline, polythiophene, polyacetylene, polypyrrole, and the like.

The positive electrode active material may be other than the positive electrode active material exemplified above. In addition, two or more kinds of positive electrode active materials exemplified above may be a mixture of two or more thereof in any suitable combination.

As a conductive agent according to an embodiment, for example, a carbon material or the like can be used. Examples of the carbon material include graphite, carbon black, acetylene black, and the like. In addition, the conductive agent may be a metal material, a conductive polymer or the like as long as it is a conductive material.

As the binder according to an embodiment, for example, a resin material or the like can be used. Examples of the resin material include polyvinylidene fluoride (PVdF), polyamide imide (PAI), polytetrafluoroethylene (PTFE), polyacrylonitrile (PAN), styrene-butadiene rubber (SBR) or carboxymethyl cellulose (CMC).

The negative electrode 22, in an embodiment, has a structure in which a negative electrode active material layer 22B is provided on both surfaces of a negative electrode current collector 22A. In addition, the negative electrode 22 may have a region where the negative electrode active material layer 22B is provided only on one surface of the negative electrode current collector 22A.

As the negative electrode current collector 22A, for example, a metal foil such as a copper foil can be used.

The negative electrode active material layer 22B contains a negative electrode active material. The negative electrode active material layer 22B may contain other materials such as a conductive agent and a binder, as required. As the conductive agent and the binder, the same materials as the conductive agent and the binder of the positive electrode 21 can be used.

As the negative electrode active material in an embodiment, for example, a material capable of absorbing and releasing lithium can be used. As the negative electrode active material, for example, a carbon material can be used. In the carbon materials, changes in crystal structure generated at the time of charging and discharging are very small, a high charge-discharge capacity can be obtained, and good cycle characteristics can be attained.

The carbon material is, for example, graphitizable carbon, non-graphitizable carbon having a (002) plane spacing of 0.37 nm or more, or graphite having a (002) plane spacing of 0.34 nm or less. More specifically, pyrolytic carbons, cokes, glassy carbon fibers, baked organic polymer compounds, activated carbon or carbon blacks and the like are used. Of these, the cokes include pitch coke, needle coke, petroleum coke, and the like. The baked organic polymer compound is one in which a polymer compound such as a phenol resin or a furan resin is baked (carbonized) at an appropriate temperature. Besides, the carbon material may be low crystalline carbon heat-treated at about 1000° C. or lower or amorphous carbon. A shape of the carbon material may be fibrous, spherical, granular or scaly.

Besides the carbon material, as the negative electrode active material, for example, a material capable of absorbing and releasing lithium and containing at least one of a metal element and a metalloid element as a constituent element (referred to as "metal-based material") can be used. The metal-based material may be, for example, a single substance, an alloy or a compound, or a mixture of two or more thereof. When the metal-based material is used, it is preferred because a high energy density can be attained. In addition, in the present technology, the alloy includes not only alloys composed of two or more kinds of metal elements but also alloys containing one or more kinds of metal elements and one or more kinds of metalloid elements. Also, the alloy may contain a nonmetallic element. In some alloys, a solid solution, a eutectic alloy (eutectic mixture), an intermetallic compound, or two or more kinds of them coexist in the composition thereof.

As the above-mentioned metal element or metalloid element, for example, a metal element or a metalloid element capable of forming an alloy with lithium can be mentioned. Specific examples of the metal element or metalloid element include magnesium, boron (B), aluminum, titanium (Ti), gallium (Ga), indium (In), silicon (Si), germanium (Ge), tin (Sn), lead (Pb), bismuth (Bi), cadmium (Cd), silver (Ag), zinc, hafnium (Hf), zirconium (Zr), yttrium (Y), palladium (Pd) or platinum (Pt). These elements may be crystalline or amorphous.

As the metal-based material, one containing a metal element or a metalloid element of group-IVB in the short period type periodic table as a constituent element is preferred. Among them, a material containing at least one of silicon and tin as a constituent element (referred to as "material containing at least one of silicon and tin") is more preferred, and a material containing at least silicon (referred to as "material containing silicon") is particularly preferred. Silicon and tin have a large ability to absorb and release lithium, and can obtain high energy density.

Examples of the material containing at least one of silicon and tin include a single substance, an alloy or a compound of silicon, a single substance, an alloy or a compound of tin, a material at least partially having one or more phases thereof, or the like.

Examples of the alloy of silicon include alloys containing, as a second constituent element other than silicon, at least one of the group consisting of tin, nickel, copper (Cu), iron, cobalt (Co), manganese, zinc, indium, silver, titanium, germanium, bismuth, antimony (Sb), chromium (Cr), and combinations thereof. Examples of the alloy of tin include alloys containing, as a second constituent element other than tin, at least one of the group consisting of silicon, nickel, copper, iron, cobalt, manganese, zinc, indium, silver, titanium, germanium, bismuth, antimony, and chromium.

As the compound of tin or the compound of silicon, for example, one containing oxygen or carbon (C) is mentioned, and in addition to tin or silicon, the above-mentioned second constituent element may be contained.

Particularly, the material containing tin is preferably a SnCoC-containing material in which cobalt, tin, and carbon are contained as constituent elements, the content of carbon is 9.9% by mass or more and 29.7% by mass or less, and the ratio of cobalt to the total of tin and cobalt is 30% by mass or more and 70% by mass or less. The reason for this is that a high energy density can be obtained in such a composition range and excellent cycle characteristics can be attained.

The SnCoC-containing material may further contain other constituent elements as necessary. As the other constituent elements, for example, silicon, iron, nickel, chromium, indium, niobium (Nb), germanium, titanium, molybdenum (Mo), aluminum, phosphorus, gallium and bismuth are preferred, and two or more kinds thereof may be contained. The reason for this is that the capacity or cycle characteristics can be further improved.

In addition, the SnCoC-containing material has a phase containing tin, cobalt, and carbon, and the phase preferably has a low crystalline or amorphous structure. Further, in the SnCoC-containing material, it is preferred that at least a part of carbon as the constituent element is bonded to a metal element or a metalloid element which is another constituent element. The reason for this is that deterioration of cycle characteristics is thought to be due to aggregation or crystallization of tin and the like, and such aggregation or crystallization can be suppressed when carbon is bonded to other elements.

As a measurement method for examining a bonding state of an element, for example, an X-ray photoelectron spectroscopy (XPS) can be mentioned. In XPS, in the case of graphite, the peak of the is orbit (Cls) of carbon appears at 284.5 eV in a device calibrated in energy in such a way that the peak of the 4f orbital (Au 4f) of the gold atom is obtained at 84.0 eV. Also, if it is surface contaminated carbon, it appears at 284.8 eV. In contrast, when the charge density of the carbon element increases, for example, when carbon is bonded to a metal element or a metalloid element, the peak of Cls appears in a region lower than 284.5 eV. That is, when the peak of the composite wave of Cls obtained for the SnCoC-containing material appears in a region lower than 284.5 eV, at least a part of the carbon contained in the SnCoC-containing material is bonded to a metal element or a metalloid element which is another constituent element.

In the XPS measurement, for example, a peak of Cls is used for correction of the energy axis of the spectrum. Normally, since surface contaminated carbon is present on the surface, the peak of Cls of surface contaminated carbon is set to 284.8 eV, which is taken as the energy reference. In the XPS measurement, the waveform of the peak of C1s is obtained in a form including the peak of the surface contaminated carbon and the peak of the carbon in the SnCoC-containing material. Therefore, by analysis using, for example, commercially available software, surface contaminated carbon peak is separated from the carbon peak in the SnCoC-containing material. In the analysis of the waveform, a position of a main peak present on the lowest bound energy side is defined as the energy reference (284.8 eV).

In addition, as the negative electrode active material in an embodiment, for example, a metal oxide or a polymer compound capable of absorbing and releasing lithium can be used. Examples of the metal oxide include lithium titanium oxide containing titanium and lithium such as lithium titanate ($Li_4Ti_5O_{12}$), iron oxide, ruthenium oxide, molybdenum oxide, and the like. Examples of the polymer compound include polyacetylene, polyaniline, polypyrrole, and the like.

In addition, a metal containing lithium may be used as the negative electrode active material. Examples of the metal containing lithium include lithium metal, an alloy containing lithium, and the like. In this case, the negative electrode active material layer 22B may be made of the metal containing lithium.

The negative electrode active material may be other than the above. In addition, two or more kinds of positive electrode active materials exemplified above may be mixed in arbitrary combination.

The negative electrode active material layer 22B may be formed by using, for example, a gas phase method, a liquid phase method, a thermal spraying method, a coating method, a firing method, or a method of two or more of them.

Examples of the gas phase method include, for example, a physical deposition method or a chemical deposition method, specifically, a vacuum deposition method, a sputtering method, an ion plating method, a laser ablation method, a thermal chemical vapor deposition (CVD) method or a plasma chemical vapor deposition method. As a liquid phase method, a publicly known method such as electrolytic plating or electroless plating can be used. The coating method is, for example, a method in which a particulate negative electrode active material is mixed with a binder or the like and then dispersed in a solvent for coating. The firing method is, for example, a method of applying heat treatment at a temperature higher than the melting point of a binder or the like after coating by a coating method. As a firing method, a publicly known method can be used, and, for example, an atmosphere firing method, a reaction firing method, and a hot press firing method can be mentioned.

The separator 23 separates the positive electrode 21 and the negative electrode 22, and allows lithium ions to pass while preventing a short circuit of the current caused by contact between both electrodes.

The separator 23 in an embodiment is, for example, a porous membrane containing a resin. The porous membrane containing the resin can be obtained, for example, by forming a resin material by a stretch-opening method, a phase separation method or the like. The method for producing the porous membrane containing the resin is not limited to these methods.

For the resin material constituting the separator 23, for example, a polyolefin resin such as polypropylene or polyethylene, an acrylic resin, a styrene resin, a polyester resin, a nylon resin or the like can be used.

The separator 23 may have a structure in which two or more porous membranes containing a resin are laminated. The porous membrane containing a resin may be a mixture of two or more kinds of resin materials (one formed by melt-kneading two or more kinds of resin materials). A porous membrane containing a polyolefin resin is preferred since it is excellent in separability between the positive electrode 21 and the negative electrode 22 and can more reduce the occurrence of internal short-circuit.

The separator 23 may be a nonwoven fabric. The nonwoven fabric is a structure in which fibers are joined or entangled, or joined and entangled, without weaving or knitting fibers. Most materials that can be processed into fibers can be used as a raw material of the nonwoven fabric, and by adjusting the shape such as fiber length and thickness, it is possible to impart the function according to the purpose and use.

As the nonwoven fabric, for example, an air permeable membrane (polyethylene terephthalate nonwoven fabric) using polyethylene terephthalate (PET) fiber and the like can be mentioned. The air permeable membrane is a membrane having air permeability. In addition, examples of the nonwoven fabric include nonwoven fabrics using aramid fiber, glass fiber, cellulose fiber, polyolefin fiber, nylon fiber, or the like. The nonwoven fabric may use two or more kinds of fibers.

Although not shown, the battery according to an embodiment of the present technology has a layer containing an insulating material (hereinafter, referred to as "insulating layer") disposed between the positive electrode 21 and the negative electrode 22. The insulating layer is contained in the wound electrode body 20 which is an electrode group, and the insulating layer is formed, for example, between the separator 23 and the positive electrode 21, between the separator 23 and the negative electrode 22, or both of them.

The insulating layer may be formed by applying onto at least one side of both surfaces of the separator 23 or by applying onto at least one side of both surfaces of the positive electrode 21 or by applying onto at least one surface of both surfaces of the negative electrode 22. When the insulating layer is applied and formed on at least one side of both surfaces of the separator 23, both of the insulating layer and the separator 23 may be referred to as a separator in some cases.

The insulating layer is, for example, a porous layer containing a resin material and insulating particles. For example, the resin material may have a three-dimensional network structure in which fibrils are formed and fibrils are continuously connected to each other.

As the insulating particles in an embodiment, for example, inorganic particles or the like can be used. Specific examples of the inorganic particles include particles of metal oxides, metal oxide hydrates, metal hydroxides, metal nitrides, metal carbides, metal sulfides, and minerals which are electrically insulating inorganic particles.

Examples of the metal oxide or metal oxide hydrate include aluminum oxide (alumina, $Al_2O_3$), boehmite ($Al_2O_3.H_2O$ or AlOOH), magnesium oxide (magnesia, MgO), titanium oxide (titania, $TiO_2$), zirconium oxide, $ZrO_2$), silicon oxide (silica, $SiO_2$), yttrium oxide (yttria, $Y_2O_3$), zinc oxide (ZnO), and the like.

Examples of the metal nitride include silicon nitride ($Si_3N_4$), aluminum nitride (AlN), boron nitride (BN), titanium nitride (TiN), and the like. Examples of the metal carbide include silicon carbide (SiC), boron carbide ($B_4C$), and the like. Examples of the metal sulfide include barium sulfate ($BaSO_4$) and the like.

Examples of the metal hydroxide include aluminum hydroxide ($Al(OH)_3$), and the like. Examples of the minerals include porous aluminosilicates such as zeolite ($M_{2/n}O.Al_2O_3.xSiO_2.yH_2O$, M is a metal element, $x \geq 2$, $y \geq 0$), layered silicate such as talc ($Mg_3Si_4O_{10}(OH)_2$), barium titanate ($BaTiO_3$), strontium titanate ($SrTiO_3$), and the like.

Examples of the other inorganic particles include particles of a lithium compound and particles of a carbon material. Examples of the lithium compound include $Li_2O_4$, $Li_3PO_4$, LiF, and the like. Examples of the carbon material include diamond and the like.

These inorganic particles may be used singly or may be used in combination of two or more kinds thereof. A shape of the inorganic particle is not particularly limited, and may be spherical, fibrous, needle-like, scaly or plate-like.

Resin material according to some embodiments may include fluorine-containing resins such as polyvinylidene fluoride and polytetrafluoroethylene; fluorine-containing rubbers such as vinylidene fluoride-tetrafluoroethylene copolymers and propylene-tetrafluoroethylene copolymers; rubbers such as styrene-butadiene copolymers and hydrogenated products thereof, acrylonitrile-butadiene copolymers and hydrogenated products thereof, acrylonitrile-butadiene-styrene copolymers and hydrogenated products thereof, methacrylic acid ester-acrylic acid ester copolymers, styrene-acrylic acid ester copolymers, acrylonitrile-acrylic acid ester copolymers, ethylene propylene rubbers, polyvinyl alcohol, and polyvinyl acetate; cellulose derivatives such as ethyl cellulose, methyl cellulose, hydroxyethyl cellulose, and carboxymethyl cellulose; resins in which at least one of a melting point and a glass transition temperature of the resin is 180° C. or higher such as polyphenylene ether, polysulfone, polyether sulfone, polyphenylene sulfide, polyether imide, polyimide, polyamide (especially aramid), polyamide-imide, polyacrylonitrile, polyvinyl alcohol, polyether, acrylic acid resin or polyester; polyethylene glycol, and the like.

The separator 23 is impregnated with an electrolytic solution which is a liquid electrolyte. The electrolytic solution is, for example, a nonaqueous electrolytic solution containing an electrolyte salt and a nonaqueous solvent in which the electrolyte salt is dissolved. The nonaqueous electrolytic solution contains 5% by mass or more of propylene carbonate as a nonaqueous solvent and contains at least one compound represented by one or both of the chemical formula (1) and the chemical formula (2). When propylene carbonate is used in a battery, high-temperature cycle characteristics are deteriorated. Further, when the amount of propylene carbonate is increased, the high-temperature cycle characteristics are further deteriorated. Also, when propylene carbonate is used in a battery having an insulating layer, high-temperature cycle characteristics are deteriorated also depending on the type of additive added. On the other hand, in the battery according to the present technology, high-temperature cycle characteristics can be improved by having an insulating layer and by using an electrolytic solution which contains a nonaqueous solvent containing propylene carbonate in an amount of 5% by mass or more, and one or more compounds represented by one or both of the chemical formula (1) and the chemical formula (2).

[Chemical Formula 1]

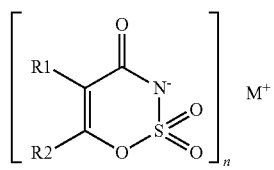

(1)

In the above formula, R1 and R2 each independently represent a hydrogen group, an alkyl group, an alkenyl group or an alkynyl group optionally having a substituent and having 1 to 4 carbon atoms, n is an integer of 1 to 3, and M is a metal ion.

[Chemical Formula 2]

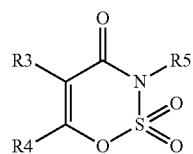

(2)

In the above formula, R3, R4 and R5 each independently represent a hydrogen group, an alkyl group, an alkenyl group or an alkynyl group optionally having a substituent and having 1 to 4 carbon atoms.

The phrase "optionally having a substituent" means that it does not have a substituent or that a hydrogen group is substituted with one or more substituents. Examples of the substituent include a hydrocarbon group, a halogen group such as a fluorine group, and the like.

In the formula (1), each of R1 and R2 is preferably a hydrogen group or a hydrocarbon group rather than an isopropyl group or an n-butyl group. Examples of the type of the metal ion M in the formula (1) include $Li^+$, $Na^+$, $K^+$, $Ca^{2+}$, and the like. In the formula (2), examples of R5 include $CH_3$—, H—, and the like. Considering the solubility in the electrolytic solution, the compound represented by the formula (1) is preferably an alkali metal salt (that is, $M^{n+}$=alkali metal ion). Considering the solubility in the electrolytic solution, as an metal ion $M^{n+}$ of the formula (1) and R5 of the formula (2), $M^{n+}=Li^+$, $M^{n+}=Na^+$, $M^{n+}=K^+$, $R5=CH_3$, $M^{n+}=Ca^{2+}$, and R5=H are preferred in this order.

The amount of at least one of the compounds represented by formula (1) and formula (2) is preferably 0.01% by mass or more and 5% by mass or less, and more preferably 0.1% by mass or more and 3% by mass or less from the viewpoint of achieving a more excellent effect.

Examples of the compound represented by the formula (1) include compounds represented by a formula (1-1) to a formula (1-5) according to some embodiments.

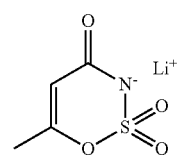

(1-1)

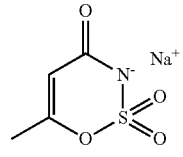

(1-2)

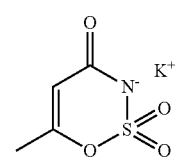

(1-3)

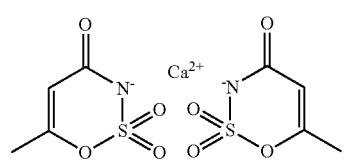

(1-4)

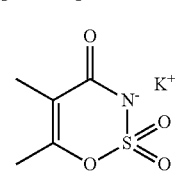

(1-5)

Examples of the compound represented by the formula (2) include compounds represented by a formula (2-1) to a formula (2-8) according to some embodiments.

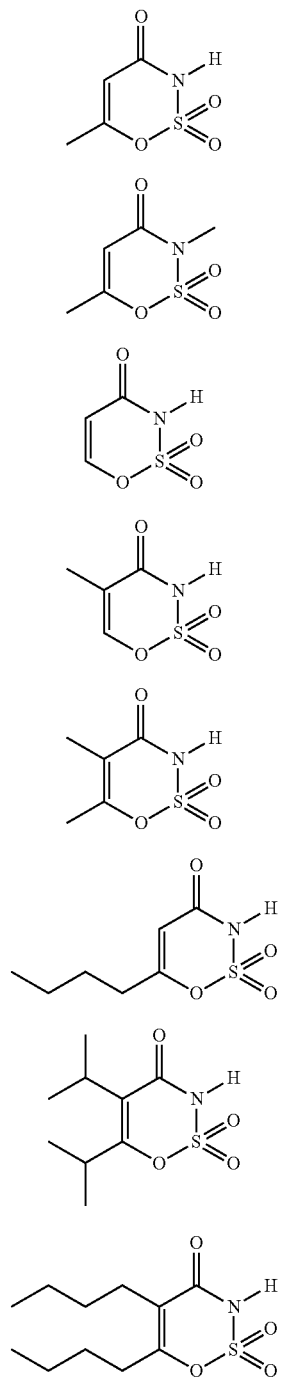

As the nonaqueous solvent, one containing propylene carbonate in an amount of 5% by mass or more with respect to the whole nonaqueous solvent is used. When the content of propylene carbonate is less than 5% by mass, the effect of improving high-temperature cycle characteristics is low even though at least one of the compounds represented by the formula (1) and the formula (2) is added as an additive. In addition, the propylene carbonate has a property of hardly solidifying at a low temperature and has the merit that battery characteristics such as cycle characteristics at low temperature can be improved by containing propylene carbonate in an amount of 5% by mass or more.

The nonaqueous solvent may contain at least one of cyclic carbonic acid ester other than propylene carbonate, chain carbonic acid ester, chain carboxylic acid ester and cyclic carboxylic acid ester together with propylene carbonate.

Examples of other cyclic carbonic acid esters include ethylene carbonate, butylene carbonate, and the like. Examples of chain carbonic acid esters include ethyl methyl carbonate, dimethyl carbonate, methyl propyl carbonate, diethyl carbonate, and the like. Examples of the chain carboxylic acid esters include ethyl propionate, propyl propionate, and the like. Examples of the cyclic carboxylic acid ester include γ-butyrolactone, and the like.

The electrolytic solution may contain additives other than the compounds represented by the formula (1) to the formula (2), as required.

Examples of other additives include dinitrile compounds, sultone (cyclic sulfonic acid ester), chain sulfonic acid ester, cyclic ether, and the like. Examples of the dinitrile compound include succinonitrile, adiponitrile, and the like. Examples of sultone include propane sultone, propene sultone, and the like. As the chain sulfonic acid ester, for example, 2-propynyl methanesulfonate and the like can be mentioned. As the cyclic ether, 1,3-dioxane and the like can be mentioned.

In addition to these, other nonaqueous solvents such as chain or cyclic halogenated carbonic acid esters may be contained as required. Examples of the cyclic halogenated carbonic acid ester include 4-fluoro-1,3-dioxolan-2-one (FEC), 4-chloro-1,3-dioxolan-2-one, 4,5-difluoro-1,3-dioxolan-2-one (DFEC), tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, 4-fluoro-4-methyl-1,3-dioxolan-2-one, and the like. Examples of chain halogenated carbonic acid esters are fluoromethyl methyl carbonate, bis(fluoromethyl) carbonate, difluoromethyl methyl carbonate, and the like.

The electrolyte salt in an embodiment includes, for example, any one type or two or more types of lithium salt and the like described below, for example. However, the electrolyte salt may include, for example, another salt (for example, light metal salt other than the lithium salt) other than the lithium salt.

Examples of the electrolyte salt as the lithium salt include lithium hexafluorophosphate (LiPF$_6$), lithium perchlorate (LiClO$_4$), lithium hexafluoroarsenate (LiAsF$_6$), lithium tetraphenylborate (LiB(C$_6$H$_5$)$_4$), Lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl), lithium bromide (LiBr), and the like.

Among them, the electrolyte salt preferably contains one type or two or more types of lithium hexafluorophosphate, lithium perchlorate and lithium hexafluoroarsenate, and it more preferably contains lithium hexafluorophosphate. The reason for this is that internal resistance is lowered, and a higher effect can be achieved.

The electrolyte salt may contain one kind or two or more kinds of other metal salts such as the lithium salt described below together with the above-mentioned lithium salt. In addition, these metal salts may not be contained in the electrolyte salt together with the above-mentioned lithium salt, and may be contained alone.

The electrolyte salt preferably includes, as other metal salts, at least any of lithium tetrafluoroborate ($LiBF_4$), lithium difluorophosphate ($LiPF_2O_2$), lithium bis(oxalato)borate (LiBOB), lithium bis(trifluoromethanesulfonyl)imide (LiTFSA), lithium bis(fluoromethanesulfonyl)imide (LiFSA), lithium monofluorophosphate ($Li_2PFO_3$), and llithium difluoro(oxalato)borate (LiDFOB). The reason for this is that a higher effect can be achieved.

In the nonaqueous electrolyte battery according to an embodiment, for example, lithium ions are released from the positive electrode 21 during charging, and are absorbed in the negative electrode 22 through the electrolytic solution with which the separator 23 is impregnated. On the other hand, during discharging, for example, lithium ions are released from the negative electrode 22 and absorbed in the positive electrode 21 through the electrolytic solution with which the separator 23 is impregnated.

The nonaqueous electrolyte battery may be designed so that an open circuit voltage at the time of complete charge (that is, the battery voltage) is, for example, within the range of 3.60 V to 6.00 V, preferably 4.20 V to 6.00 V, and more preferably 4.40 V to 6.00 V. When the open circuit voltage at the time of complete charge is, for example, set to 4.40 V or more in a battery using layered rock salt type lithium composite oxide or the like as the positive electrode active material, the amount of lithium released per unit mass increases as compared with the 4.20 V battery even in the same positive electrode active material, the amounts of the positive electrode active material and the negative electrode active material are adjusted correspondingly to obtain high energy density.

A manufacturing method of nonaqueous electrolyte battery according to an embodiment is provided. The nonaqueous electrolyte battery is produced, for example, by the following procedure.

First, the positive electrode 21 is prepared. First, a positive electrode active material and, as required, a binder and a conductive agent and the like are mixed to form a positive electrode mixture, which is then dispersed in, for example, an organic solvent to prepare a paste or slurry positive electrode mixture slurry.

Subsequently, the positive electrode mixture slurry is uniformly applied onto both surfaces of the positive electrode current collector 21A and then dried to form the positive electrode active material layer 21B. Finally, the positive electrode active material layer 21B is compression-molded using a roll press machine or the like while heating the positive electrode active material layer 21B as required. In this case, compression molding may be repeated a plurality of times.

Next, the negative electrode 22 is prepared by the same procedure as in the positive electrode 21 described above. First, a negative electrode active material and, as required, a binder and a conductive agent or the like are mixed to form a negative electrode mixture, which is then dispersed in, for example, an organic solvent to prepare a paste or slurry negative electrode mixture slurry.

Thereafter, the negative electrode mixture slurry is uniformly applied onto both surfaces of the negative electrode current collector 22A and dried to form the negative electrode active material layer 22B, and then the negative electrode active material layer 22B is compression-molded.

Finally, a nonaqueous electrolyte battery is assembled using the positive electrode 21 and the negative electrode 22. Next, the positive electrode lead 25 is attached to the positive electrode current collector 21A by welding or the like, and the negative electrode lead 26 is attached to the negative electrode current collector 22A by welding or the like. Subsequently, the positive electrode 21 and the negative electrode 22 are laminated and wound with the separator 23 having the insulating layers formed on both surfaces thereof interposed between the positive electrode and the negative electrode to form the wound electrode body 20, and then a center pin 24 is inserted into the winding center.

Subsequently, the wound electrode body 20 is housed inside the battery can 11 while being sandwiched between the pair of insulating plates 12, 13. In this case, a tip of the positive electrode lead 25 is attached to the safety valve mechanism 15 by welding or the like, and a tip of the negative electrode lead is attached to the battery can 11 by welding or the like. Subsequently, an electrolytic solution is filled inside the battery can 11 to impregnate the separator 23 with the electrolytic solution. Finally, the battery cover 14, the safety valve mechanism 15, and the positive temperature coefficient element 16 are crimped at the open end of the battery can 11 with a gasket 17 interposed therebetween. Thereby, the nonaqueous electrolyte battery shown in FIG. 1 and FIG. 2 is completed.

When a nonaqueous solvent containing propylene carbonate is used in a battery having an insulating layer, there is a problem that the high-temperature cycle characteristics is deteriorated as compared with a battery not having an insulating layer, depending on the type of the additive. On the other hand, in the battery according to the first embodiment of the present technology, it is possible to improve the high-temperature cycle characteristics by having an insulating layer and by using an electrolytic solution which contains a nonaqueous solvent containing propylene carbonate in an amount of 5% by mass or more, and at least one of the compounds represented by a formula (1) to a formula (2) as an additive.

Figure 3:
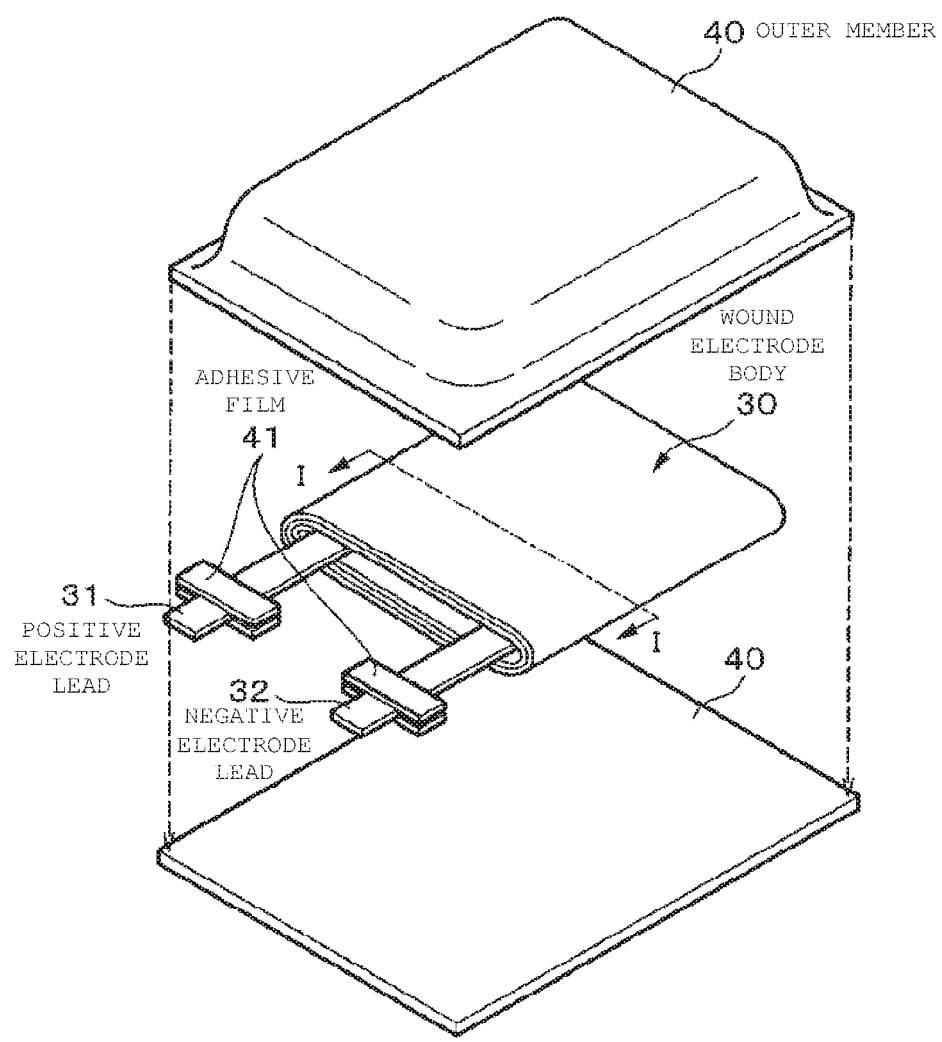
FIG. 3 is an exploded perspective view illustrating a configuration example of the battery according to an embodiment of the present technology.
Figure 4:
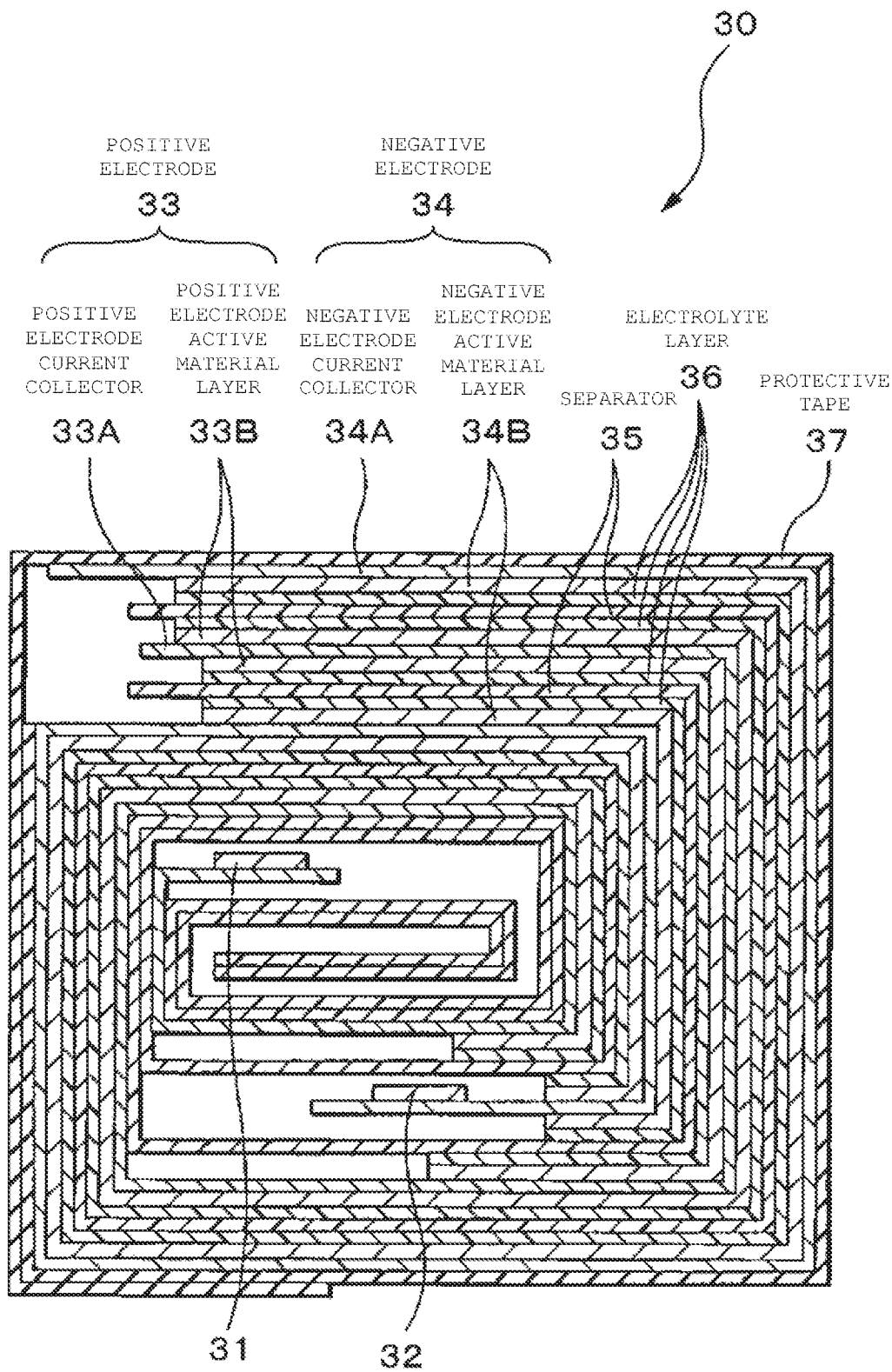
FIG. 4 is a cross-sectional view illustrating a cross-sectional configuration taken along line I-I of a wound electrode body shown in FIG. 3 according to an embodiment.

In another embodiment of the present technology, as an example, a laminated film type battery will be described with reference to FIG. 3 and FIG. 4.

The nonaqueous electrolyte battery is one in which a wound electrode body 30 is housed inside an outer member 40. A positive electrode lead 31 and a negative electrode lead 32 are attached to the wound electrode body 30. For example, the positive electrode lead 31 and the negative electrode lead 32 are led out from the inside to the outside of the outer member 40 in the same direction.

The outer member 40 in an embodiment includes a film-like member. The outer member 40 is, for example, a laminated film in which a fusing layer, a metal layer, and a surface protective layer are laminated in this order. The fusing layer is made of, for example, a polyolefin resin such as polyethylene or polypropylene. The metal layer is made of, for example, aluminum or the like. The surface protective layer is made of, for example, nylon or polyethylene terephthalate. The outer member 40 may be a laminated film having another laminate structure or a simple polymer film or a simple metallic film.

An adhesive film 41 is interposed between the outer member 40 and the positive electrode lead 31. Similarly, the adhesive film is interposed between the outer member 40 and the negative electrode lead 32. The adhesive film 41 is made of, for example, a material highly adhesive to a metal material. As the metal material, for example, a resin material such as a polyolefin resin is mentioned.

The wound electrode body 30 is formed by laminating and winding a positive electrode 33 and a negative electrode 34 with a separator 35 and an electrolyte layer 36 interposed therebetween, and its outermost peripheral portion is protected by a protective tape 37. In addition, the wound electrode body 30 may be one in which the separator 35 is omitted.

The positive electrode 33 is, for example, one in which a positive electrode active material layer 33B is provided on both surfaces of a positive electrode current collector 33A. The configurations of the positive electrode current collector 33A and the positive electrode active material layer 33B are the same as those of the positive electrode current collector 21A and the positive electrode active material layer 21B of the first embodiment, respectively. The negative electrode 34 is, for example, one in which a negative electrode active material layer 34B is provided on both surfaces of a negative electrode current collector 34A. The configurations of the negative electrode current collector 34A and the negative electrode active material layer 34B are the same as those of the negative electrode current collector 22A and the negative electrode active material layer 22B of the first embodiment, respectively. The configuration of the separator 35 is the same as that of the separator 23 of the first embodiment.

The electrolyte layer 36 in an embodiment is obtained by holding an electrolytic solution with a polymer compound, and may contain other materials such as various additives as required. The electrolyte layer 36 is, for example, a so-called gel electrolyte. A gel electrolyte is preferred because a high ion conductivity (for example, 1 mS/cm or more at room temperature) can be obtained and leakage of an electrolytic solution can be prevented.

Examples of the polymer compound include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, a copolymer of vinylidene fluoride and hexafluoropyrene, and the like. These may be used singly or in combination of plural kinds. Among them, polyvinylidene fluoride or a copolymer of vinylidene fluoride and hexafluoropyrene are preferred. This is because these are electrochemically stable.

The electrolytic solution is the same as in the first embodiment. However, in the electrolyte layer 36 which is a gel electrolyte, the solvent of the electrolytic solution is not only a liquid solvent but also a wide concept including a substance having ion conductivity capable of dissociating an electrolyte salt. Therefore, when a polymer compound having ion conductivity is used, the polymer compound is also included in the solvent.

Instead of the gel electrolyte layer 36 in which the electrolytic solution is held by the polymer compound, the electrolytic solution may be used as it is. In this case, the separator 35 is impregnated with the electrolytic solution.

Although not shown, the battery according to an embodiment of the present technology has an insulating layer similar to that of the first embodiment. The insulating layer is contained in the wound electrode body 30 which is an electrode group, and the insulating layer is formed, for example, between the separator 35 and the positive electrode 33, between the separator 35 and the negative electrode 34, or both of them.

The insulating layer may be formed by applying onto at least one side of both surfaces of the separator 35 or by applying onto at least one side of both surfaces of the positive electrode 33 or by applying onto at least one surface of both surfaces of the negative electrode 34. When an insulating layer is applied and formed on at least one side of both surfaces of the separator 35, both of the insulating layer and the separator 35 may be referred to as a separator in some cases.

Further, the electrolyte layer 36 may be an insulating layer. In this case, the electrolyte layer 36 contains insulating particles. As the insulating particles, the same particles as those described above can be used. In this case, an insulating layer does not have to be formed between the separator 35 and the positive electrode 33, and/or the separator 35 and the negative electrode 34.

A manufacturing method of nonaqueous electrolyte battery according to another embodiment is provided. The nonaqueous electrolyte battery is produced by, for example, the following three types of procedures.

In the first manufacturing method in an embodiment, first, the positive electrode 33 and the negative electrode 34 are prepared in the same manner as in the first embodiment. An electrolytic solution is prepared by dissolving an electrolyte salt in a nonaqueous solvent.

Next, a precursor solution containing the electrolytic solution, a polymer compound, and a solvent is prepared, applied onto the positive electrode 33 and the negative electrode 34, and then the solvent is volatilized to form a gel electrolyte layer 36. In addition, when the electrolyte layer is an insulating layer, a precursor solution to which insulating particles are further added is used as the precursor solution. Subsequently, the positive electrode lead 31 is attached to the positive electrode current collector 33A by welding or the like, and the negative electrode lead 32 is attached to the negative electrode current collector 34A by welding or the like.

Next, the positive electrode 33 and the negative electrode 34 on which the electrolyte layers 36 are formed, respectively, are laminated and wound with the separator 35 having insulating layers formed on both surfaces thereof interposed between the positive electrode and the negative electrode, and the protective tape 37 is bonded to the outermost peripheral portion of the wound electrodes to prepare a wound electrode body 30.

Finally, after the wound electrode body 30 is sandwiched between the two film-like outer members 40, the outer edge portions of the outer member 40 are bonded to each other by thermal fusion bonding or the like to enclose the wound electrode body 30. At this time, the adhesive films 41 are inserted between the positive electrode lead 31 and the outer member 40 and between the negative electrode lead 32 and the outer member 40 respectively. Thereby, the nonaqueous electrolyte battery shown in FIG. 3 and FIG. 4 is completed.

In the second manufacturing method according an embodiment, first, the positive electrode lead 31 is attached to the positive electrode 33 and the negative electrode lead 32 is attached to the negative electrode 34. Subsequently, the positive electrode 33 and the negative electrode 34 are laminated and wound with the separator 35 having the insulating layers formed on both surfaces thereof interposed between the positive electrode and the negative electrode, and the protective tape 37 is bonded to the outermost peripheral portion of the wound electrodes to prepare a wound body as a precursor of the wound electrode body 30.

Next, after the wound body was sandwiched between two film-like outer members 40, remaining outer peripheral edge portions excluding the outer peripheral edge portions of one side of the outer members 40 are bonded to each other by thermal fusion bonding or the like to house the wound body inside a bag-like outer member 40. Subsequently, a composition for an electrolyte containing an electrolytic solution, a monomer as a raw material of the polymer compound, a polymerization initiator, and, as required, another material such as a polymerization inhibitor, is prepared, and filled inside the bag-like outer member 40, and then an opening of the outer member 40 is sealed by thermal fusion bonding or the like. In addition, when the electrolyte layer is an insulating layer, a composition to which an insulating particle is further added is used as the composition for an electrolyte.

Finally, the monomer is thermally polymerized into a polymer compound to form a gel electrolyte layer 36. Thereby, the nonaqueous electrolyte battery is completed.

In the third manufacturing method according to a further embodiment, first, a wound body is formed and housed inside a bag-like outer member 40 in the same manner as in the above-described second manufacturing method except for using a separator 35 having polymer compounds and insulating particles applied onto both surfaces thereof.

Next, an electrolytic solution is prepared and filled inside the outer member 40, and then the opening of the outer member 40 is sealed by thermal fusion bonding or the like. Finally, the outer member 40 is heated while applying a load, and the separator 35 is brought into close contact with the positive electrode 33 and the negative electrode 34 with the polymer compound interposed between the separator and the positive electrode and between the separator and the negative electrode. Thereby, the polymer compound is impregnated with the electrolytic solution, and the polymer compound gelates to form the electrolyte layer 36 (that is, the insulating layer) containing the insulating particles, thus completing a nonaqueous electrolyte battery.

In the battery according to an embodiment of the present technology, the same effects can be attained.

Figure 5:
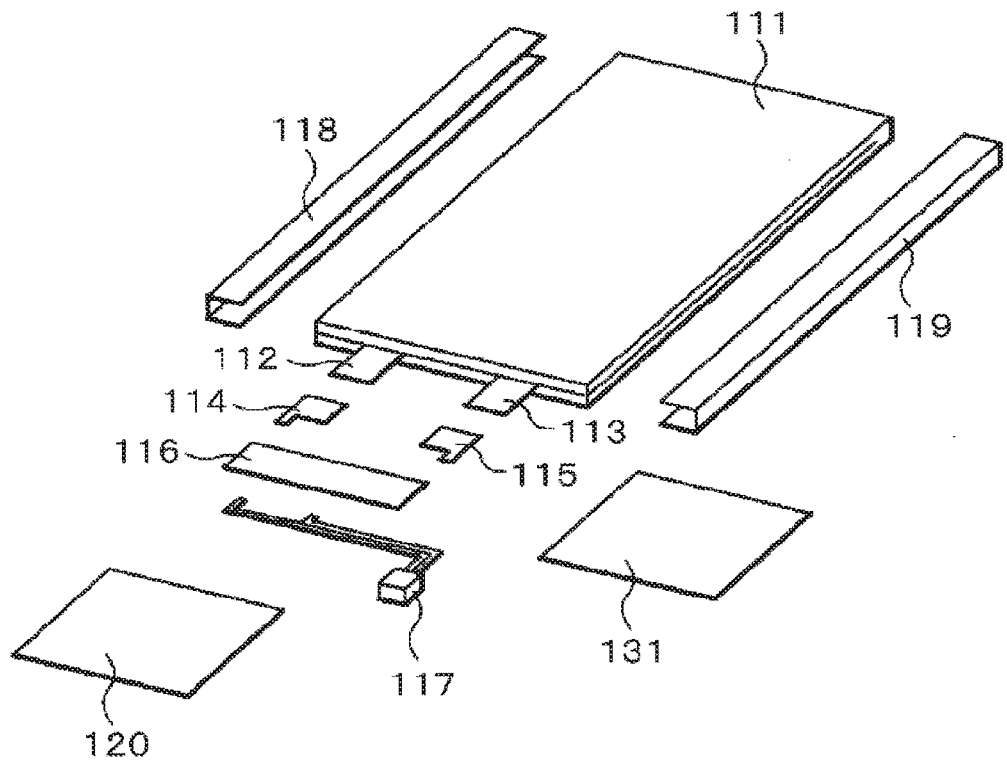
FIG. 5 is a perspective view illustrating a configuration example of a battery pack according to an embodiment of the present technology.

In another embodiment of the present technology, an example of a configuration of a battery pack will be described with reference to FIG. 5 and FIG. 6.

The battery pack is a simplified type battery pack (so-called soft pack) using one secondary battery (unit cell), and is built in an electronic device typified by a smartphone, for example. The battery pack includes a battery cell 111 and a circuit board 116 connected to the battery cell 111. The battery cell 111 is, for example, a laminated film type secondary battery according to the second embodiment.

A pair of adhesive tapes 118, 119 are bonded to both side surfaces of the battery cell 111. On the circuit board 116, a protection circuit module (PCM) is formed. The circuit board 116 is connected to a positive electrode lead 112 and a negative electrode lead 113 of the battery cell 111 via a pair of tabs 114 and 115 and also connected to a lead 117 with connector for external connection. In a state where the circuit board 116 is connected to the battery cell 111, the circuit board 116 is protected from above and below by a label 120 and an insulating sheet 131. By bonding the label 120, the circuit board 116, the insulating sheet 131 and the like are fixed.

Figure 6:
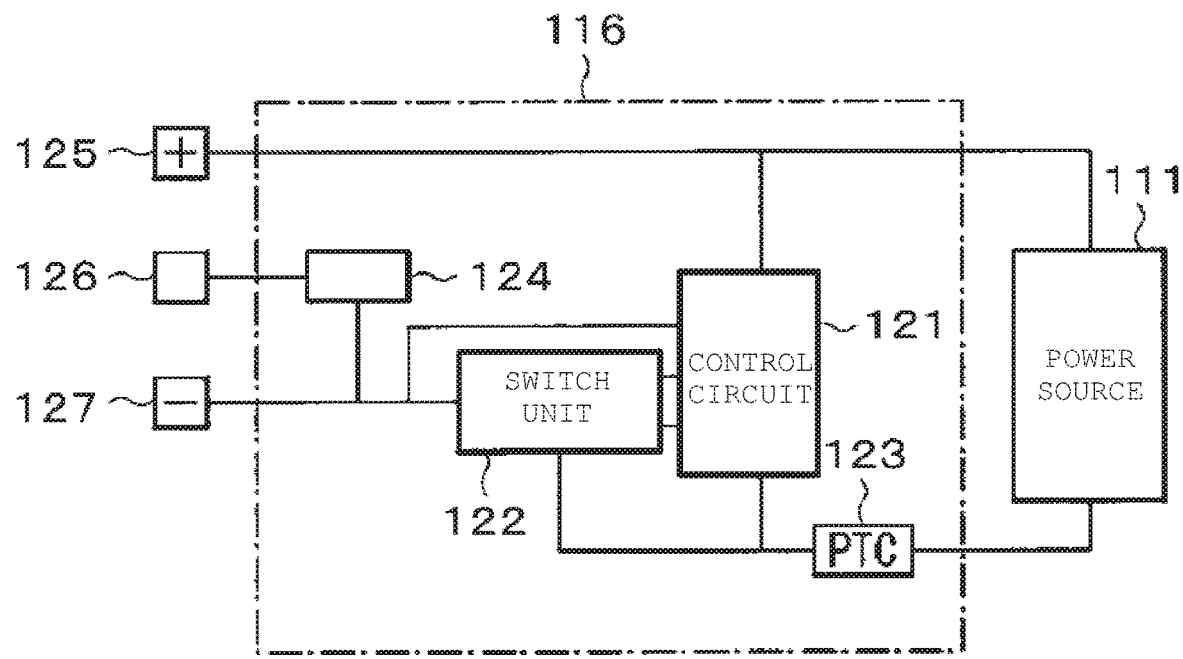
FIG. 6 is a block diagram illustrating the configuration example of a battery pack shown in FIG. 5 according to an embodiment.

Further, as shown in FIG. 6, the battery pack includes a battery cell 111 corresponding to a power source and a circuit board 116. The circuit board 116 includes, for example, a control circuit 121 including a processor, a switch unit 122, a PTC 123, and a temperature detection unit 124. Since the battery cell 111 can be connected to the outside via a positive electrode terminal 125 and a negative electrode terminal 127, the battery cell 111 is charged and discharged via the positive electrode terminal 125 and the negative electrode terminal 127. The temperature detection unit 124 can detect a temperature using a temperature detection terminal (so-called T terminal) 126.

The control circuit 121 controls the operation of the entire battery pack (including the use state of the battery cell 111), and includes, for example, a central processing unit (CPU) or a processor, a memory, and the like.

For example, when the battery voltage reaches the overcharge detection voltage, the control circuit 121 disconnects the switch unit 122 so that charge current does not flow through the current path of the battery cell 111. Further, for example, when a large current flows during charging, the control circuit 121 disconnects the switch unit 122 and cuts off the charge current.

In addition to this, when the battery voltage reaches the overdischarge detection voltage, for example, the control circuit 121 disconnects the switch unit 122 so that no discharge current flows through the current path of the battery cell 111. Further, for example, when a large current flows during discharging, the control circuit 121 cuts off the discharge current by disconnecting the switch unit 122.

An example of the overcharge detection voltage of the secondary battery is 4.20 V±0.05 V or the like. An example of the overdischarge detection voltage is 2.4 V±0.1 V or the like.

The switch unit 122 switches the use state (availability of connection between the battery cell 111 and the external device) of the battery cell 111 according to an instruction from the control circuit 121. The switch unit 122 includes, for example, a charge control switch and a discharge control switch. The charge control switch and the discharge control switch are, for example, semiconductor switches such as a field effect transistor (MOSFET) using a metal oxide semiconductor. The charge-discharge current is detected, for example, based on the ON resistance of the switch unit 122.

The temperature detection unit 124 measures the temperature of the battery cell 111 and outputs the measurement result to the control circuit 121, and includes, for example, a temperature detection element such as a thermistor. The measurement result by the temperature detection unit 124 is used when the control circuit 121 performs charge-discharge control at the time of abnormal heat generation, or when the control circuit 121 performs correction processing in calculating a remaining capacity, or the like.

In addition, the circuit board 116 does not have to include the PTC 123. In this case, a separate PTC element may be attached to the circuit board 116.

Figure 7:
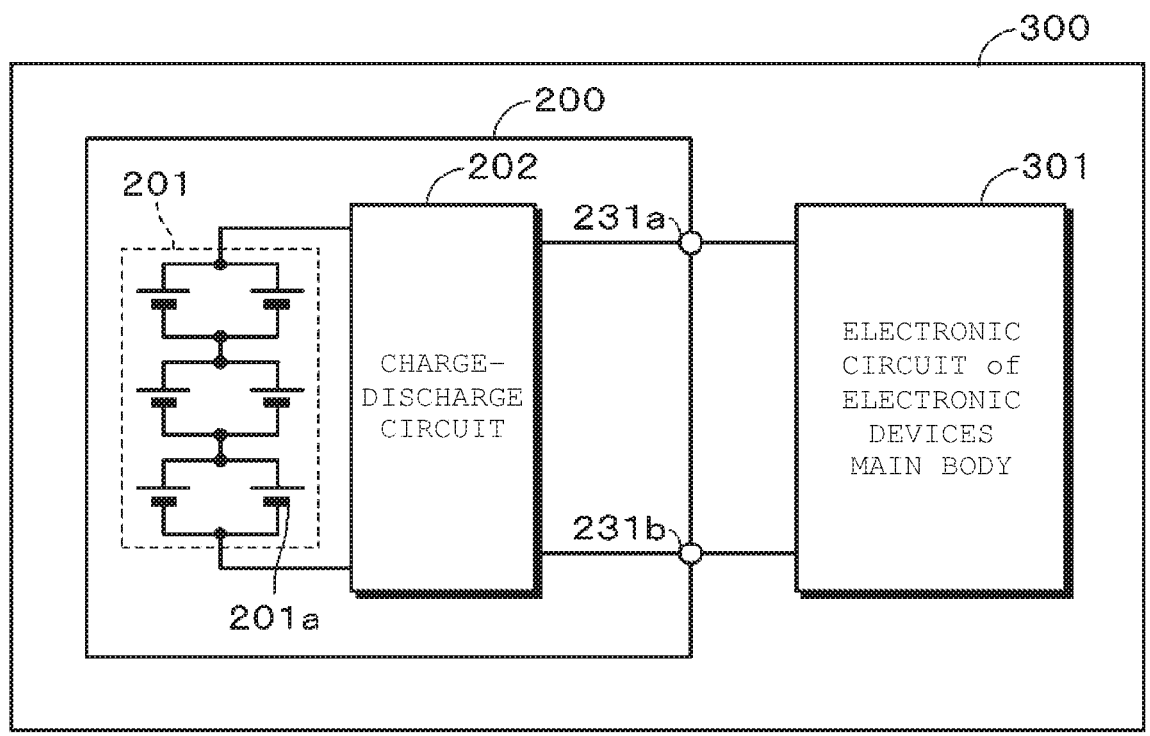
FIG. 7 is a block diagram illustrating one configuration example of an electronic device according to an embodiment of the present technology.

In another embodiment of the present technology, an example of a configuration of an electronic device will be described with reference to FIG. 7.

An electronic device 300 in an embodiment includes an electronic circuit 301 of the electronic device main body and a battery pack 200. The battery pack 200 is electrically connected to the electronic circuit 301 via a positive electrode terminal 231*a* and a negative electrode terminal 231*b*. For example, the electronic device 300 has a configuration which allows the user to detachably attach the battery pack 200. The configuration of the electronic device 300 is not limited to the above configuration, and the electronic device 300 may have a configuration in which the battery pack 200 is incorporated in the electronic device 300 so that the user cannot remove the battery pack 200 from the electronic device 300.

When the battery pack 200 is charged, the positive electrode terminal 231*a* and the negative electrode terminal 231*b* of the battery pack 200 are connected to a positive electrode terminal and a negative electrode terminal of a charger (not shown), respectively. On the other hand, when the battery pack 200 is discharged (when the electronic device 300 is used), the positive electrode terminal 231*a* and the negative electrode terminal 231*b* of the battery pack 200 are connected to a positive electrode terminal and a negative electrode terminal of the electronic circuit 301, respectively.

Examples of the electronic device 300 include, but are not limited to, a notebook-sized personal computer, a tablet computer, a mobile phone (smart phone, etc.), personal digital assistants (PDA), display devices (LCD, EL display, electronic paper, head mounted display (HMD), etc.), imaging devices (digital still camera, digital video camera, etc.), audio instruments (potable audio player, etc.), a game machine, a cordless phone handset, an electronic book, an electronic dictionary, a radio, a headphone, a navigation system, a memory card, a pace maker, a hearing aid, an electric power tool, an electric shaver, a refrigerator, an air conditioner, a television set, a stereo, a water heater, a microwave oven, a dishwashing machine, a washing machine, a drier, lighting equipment, a toy, a medical device, a robot, a load conditioner, a traffic light, and the like.

The electronic circuit 301 in an embodiment includes, for example, a CPU, a peripheral logic part, an interface part, a storage part, and the like, and controls the entire of the electronic device 300.

The battery pack 200 in an embodiment is a battery pack of an assembled battery which includes an assembled battery 201 and a charge-discharge circuit 202. The assembled battery 201 is configured by connecting a plurality of secondary batteries 201*a* in series and/or in parallel. The plurality of secondary batteries 201*a* are connected, for example, such that n batteries are connected in parallel and m batteries are connected in series (n and m are positive integers). FIG. 7 shows an example in which six secondary batteries 201*a* are connected with two batteries in parallel and three batteries in series (2P3S). As the secondary battery 201*a*, the battery according to the first embodiment is used.

At the time of charging, the charge-discharge circuit 202 controls charge to the assembled battery 201. On the other hand, at the time of discharging (that is, when the electronic device 300 is used), the charge-discharge circuit 202 controls discharge to the electronic device 300.

In place of the battery pack 200, the battery according to the first embodiment or the second embodiment, or the battery pack of the unit cell according to the third embodiment may be used.

In another embodiment of the present technology, an example of an electric storage system including the battery according to some embodiments in the electric storage device will be described.

The electric storage system may be any system as long as it uses electric power and includes merely an electric power device. The electric power system includes, for example, a smart grid, a household energy management system (HEMS), a vehicle, and the like, and can also store electricity.

The electric storage device (electric storage module) is applied to, for example, power sources for electric power storage for buildings including houses or power generation facilities. As an example of the electric storage device, an electric storage module including a battery block in which a plurality of batteries are connected in at least one of a parallel manner and a series manner, and a control circuit for controlling charging and discharging of these battery blocks, is mentioned. An example of the configuration of the electric storage device is, for example, a plurality of battery blocks housed in an outer case. For the battery, the battery according to the embodiments as described herein can be used.

Examples of the electric storage system include, for example, the following first to fifth electric storage systems and the like. The first electric storage system is an electric storage system in which the electric storage device is charged by a power generation device that generates power from renewable energy. The second electric storage system is an electric storage system which has an electric storage device and supplies power to an electronic device connected to the electric storage device. The third electric storage system is an electric storage system including electronic devices which receive power supply from the electric storage device. These electric storage systems are implemented as a system which achieves efficient supply of power in cooperation with an external power supply network.

The fourth electric storage system is an electric power system including an electric power information transmitting and receiving unit which transmits and receives signals to and from another device via a network, and performing charge-discharge control of the above-mentioned electric storage device based on information received by the transmitting and receiving unit. The fifth electric storage system is an electric power system which receives power supply from the above-mentioned electric storage device or supplies electric power from the power generation device or the power network to the electric storage device. Hereinafter, an electric storage system applied to a house and an electric vehicle will be described.

Figure 8:
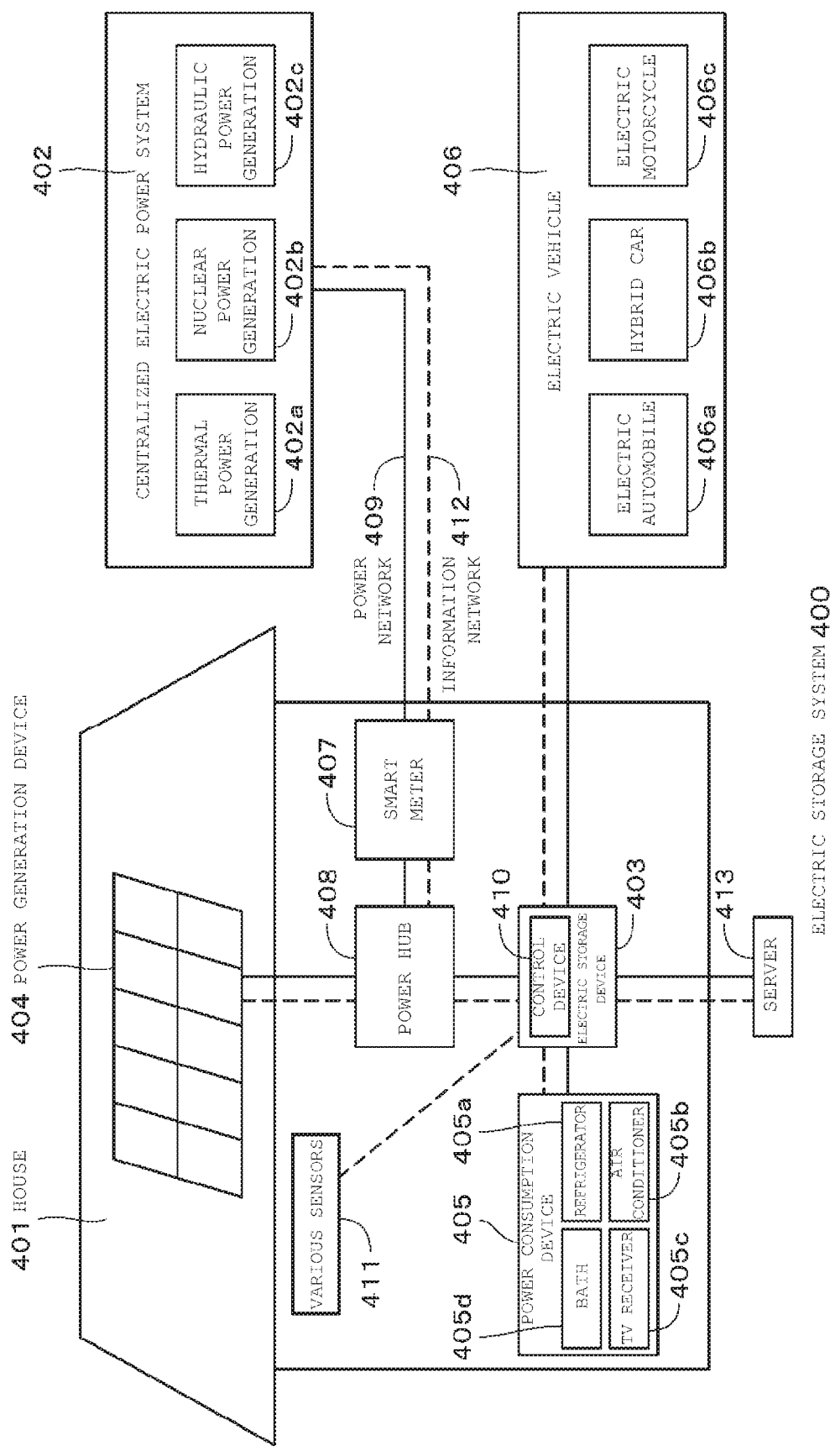
FIG. 8 is a schematic diagram illustrating one configuration example of an electric storage system according to an embodiment of the present technology.

Hereinafter, with reference to FIG. 8, a configuration example of an electric storage system (electric power system) 400 according to an embodiment will be described. The electric storage system 400 is an electric storage system for residential use, and electric power is supplied from a centralized electric power system 402 such as a thermal power generation 402*a*, a nuclear power generation 402*b*, and a hydraulic power generation 402*c* to the electric storage device 403 via a power network 409, an information network 412, a smart meter 407, a power hub 408, and the like. With this, electric power is supplied from an independent power source such as domestic power generation device 404 to the electric storage device 403. The electric power supplied to the electric storage device 403 is stored. Electric power to be used in a house 401 is supplied by way of the electric storage device 403. A similar electric storage system can be used not only for the house 401 but also for a building.

In the house 401, the domestic power generation device 404, power consumption equipment 405, the electric storage device 403, a control device 410 that controls each equipment, the smart meter 407, the power hub 408, and sensors 411 that acquire various kinds of information are provided. The respective pieces of equipment are connected by the power network 409 and the information network 412. A solar cell, a fuel cell, or the like is used as the domestic power generation device 404, and the generated electric power is supplied to the power consumption equipment 405 and/or the electric storage device 403. The power consumption equipment 405 is a refrigerator 405*a*, an air conditioner 405*b*, a television receiver 405*c*, a bath 405*d* or the like. Furthermore, the power consumption equipment 405 includes an electric vehicle 406. The electric vehicle 406 is an electric automobile 406*a*, a hybrid car 406*b*, an electric motorbicycle 406*c* or the like.

The electric storage device 403 includes one or more batteries according to the embodiments as described herein. The smart meter 407 has a function of measuring the use amount of commercial power and sending the use amount measured to an electric power company. The power network 409 may be any one or combination of DC (direct current) power supply, AC (alternate current) power supply, and non-contact power supply.

The various sensors 411 include, for example, a human sensor, an illuminance sensor, an object detection sensor, a power consumption sensor, a vibration sensor, a contact sensor, a temperature sensor, an infrared sensor, and the like. Information acquired by the various sensors 411 is transmitted to the control device 410. Based on the information from the sensors 411, the state of weather, the state of person, and the like are grasped and the power consumption equipment 405 is automatically controlled to allow minimization of the energy consumption. Further, the control device 410 can transmit information relating to the house 401 to an external electric power company or the like via an Internet.

Branching of the power line and processing of DC-AC conversion, and the like are carried out by the power hub 408. As a communication system of the information network 412 connected to the control device 410, there are a method of using a communication interface such as UART (Universal Asynchronous Receiver-Transceiver: transmitting/receiving circuit for asynchronous serial communication) and a method of utilizing a sensor network based on a wireless communication standard such as Bluetooth (registered trademark), ZigBee or Wi-Fi. Bluetooth (registered trademark) system is applied to multimedia communication and allows communication of a one-to-many connection. ZigBee is a standard using a physical layer of IEEE (Institute of Electrical and Electronics Engineers) 802.15.4. IEEE 802.15.4 is the name of a short-range wireless network standard called PAN (Personal Area Network) or W (Wireless) PAN.

The control device 410 is connected to an external server 413. The server 413 may be managed by any of the house 401, an electric power company, and a service provider. The information transmitted and received by the server 413 is, for example, power consumption information, life pattern information, electric power bill, weather information, natural disaster information, and information relating to power trading. These pieces of information may be transmitted and received from power consumption device (for example, a television receiver) in the home, or may be transmitted and received from a device outside the home (for example, mobile phone, etc.). These pieces of information may be displayed on a device having a display function, for example, a television receiver, a cellular phone, a PDA, or the like.

The control device 410 which controls each unit is composed of a CPU, a RAM, a ROM, and the like, and in this example, the control device 410 is stored in the electric storage device 403. The control device 410 is connected to the electric storage device 403, the domestic power generation device 404, the power consumption equipment 405, the various sensors 411, and the server 413 via the information network 412, and has, for example, a function of adjusting the use amount of commercial power and the amount of power generation. In addition to this, the control device 410 may have a function of carrying out power trading in a power market and the like.

As described above, not only electric power by the centralized electric power system 402 of the thermal power generation 402a, the nuclear power generation 402b, the hydraulic power generation 402c or the like, but also generated electric power of the domestic power generation device 404 (solar power generation, wind power generation) can be stored in the electric storage device 403. Therefore, even though the generated electric power of the domestic power generation device 404 varies, it is possible to perform such control that the amount of electric power sent to the outside is made constant or discharged as necessary. For example, electric power obtained by solar power generation is stored in the electric storage device 403 and low-cost late-night power is stored in the electric storage device 403 in the night. Furthermore, the electric power stored by the electric storage device 403 is discharged and utilized in a high-cost time zone in the daytime.

Although the example in which the control device 410 is stored in the electric storage device 403 has been described in this example, the control device 410 may be stored in the smart meter 407 or may be configured singly. Further, the electric storage system 400 may be used for a plurality of homes in a collective housing, or may be used for a plurality of single-family houses.

In another embodiment of the present technology, an example of an electric vehicle including the battery according to the first embodiment or the second embodiment will be described. Examples of electric vehicles include railroad vehicles, golf carts, electric carts, electric automobiles (including hybrid automobile), agricultural work vehicles (tractors, combines, etc.), and the like. An example of an electric automobile will be described below.

Figure 9:
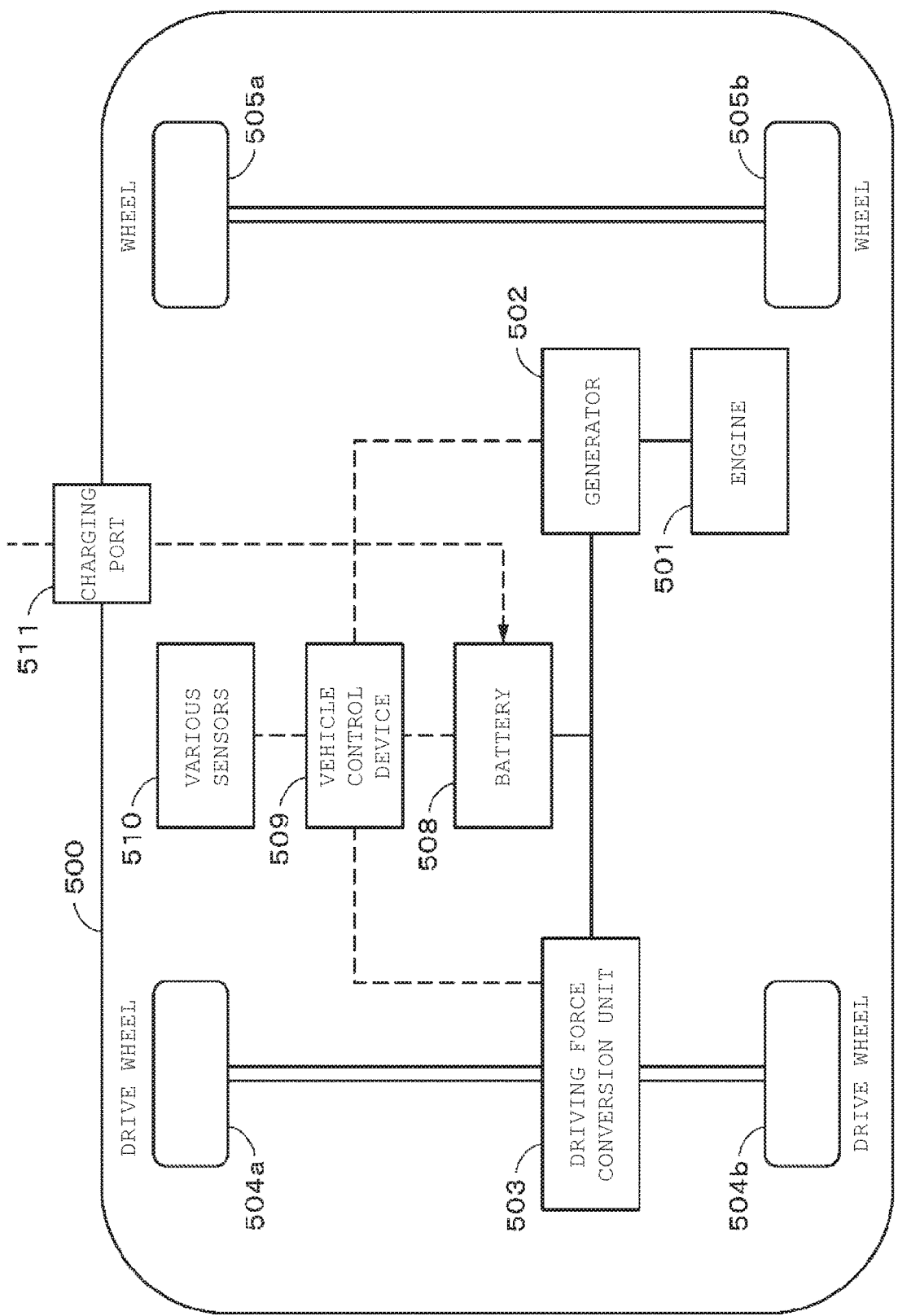
FIG. 9 is a schematic diagram illustrating one configuration example of an electric vehicle according to an embodiment of the present technology.

With reference to FIG. 9, a configuration example of an electric vehicle according to the embodiment of the present technology will be described. This hybrid vehicle 500 is a hybrid vehicle employing a series hybrid system. The series hybrid system is a car that runs with an electric power driving force converting device 503 by using electric power generated by an electric generator activated through an engine or electric power once stored in a battery.

In the hybrid vehicle 500, an engine 501, an electric generator 502, the electric power driving force converting device 503, a driving wheel 504a, a driving wheel 504b, a wheel 505a, a wheel 505b, a battery 508, a vehicle control device 509, various sensors 510, and a charging port 511 are mounted. As the battery 508, the battery according to the first embodiment or the second embodiment is used.

The hybrid vehicle 500 runs by using the electric power driving force converting device 503 as a power source. One example of the electric power driving force converting device 503 is a motor. The electric power driving force converting device 503 is operated by the electric power of the battery 508 and a rotational force of the electric power driving force converting device 503 is transmitted to the driving wheels 504a and 504b. By using direct current-alternating current (DC-AC) conversion or reverse conversion (AC-DC conversion) for the necessary place, the electric power driving force converting device 503 can be applied to both an AC motor and a DC motor. The various sensors 510 control the engine rotational speed via the vehicle control device 509 and control the opening degree of a throttle valve that is not shown in the diagram (throttle opening). The various sensors 510 include a velocity sensor, an acceleration sensor, an engine rotational speed sensor, or the like.

The rotational force of the engine 501 is transmitted to the electric generator 502, and the electric power generated by the electric generator 502 through the rotational force can be accumulated in the battery 508.

When the hybrid vehicle 500 decelerates by a braking mechanism (not shown in the diagram), resistance force at the time of deceleration is applied to the electric power driving force converting device 503 as a rotational force, and regenerative electric power generated by the electric power driving force converting device 503 through the rotational force is accumulated in the battery 508 by the rotational force.

It is also possible that the battery 508 is connected to a power source outside the hybrid vehicle 500 through the charging port 511 to thereby receive supply of electric power from the external power source by using the charging port 511 as an input port and to accumulate the received electric power.

Although not shown in the diagram, the hybrid vehicle 500 may include an information processing device which executes information processing relating to vehicle control based on information concerning the battery. As such an information processing device, for example, there is an information processing device for displaying the battery remaining capacity based on information concerning the remaining capacity of the battery, or the like.

The above is an example of the series hybrid car which runs with a motor by using electric power generated by an electric generator activated through an engine or electric power once stored in a battery. However, the present technology can be effectively applied also to a parallel hybrid car which employs both outputs of engine and motor as the drive source and uses, with appropriate switching, three systems, running by only the engine, running by only the motor, and running by the engine and the motor. Furthermore, the present technology can be effectively applied also to a so-called electric vehicle which does not use an engine and runs by driving by only a drive motor.

Hereinafter, the present technology will be described in detail by examples according to an embodiment. It should be noted that the present technology is not limited to the configurations of the following examples.

The Ch A to Ch N in the following description are as follows.

Ch A: Compound represented by a formula (2-1)

(2-1)

Ch B: Compound represented by a formula (1-1)

(1-1)

Ch C: Compound represented by a formula (1-2)

(1-2)

Ch D: Compound represented by a formula (1-3)

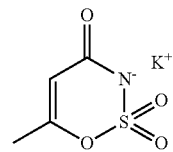

(1-3)

Ch E: Compound represented by a formula (1-4)

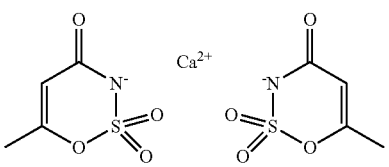

(1-4)

Ch F: Compound represented by a formula (2-2)

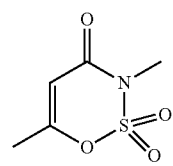

(2-2)

Ch G: Compound represented by a formula (2-3)

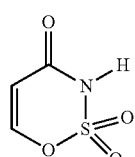

(2-3)

Ch H: Compound represented by a formula (2-4)

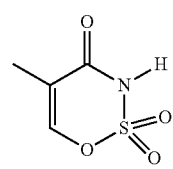

(2-4)

Ch I: Compound represented by a formula (2-5)

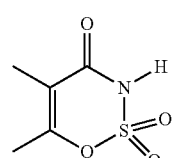

(2-5)

Ch J: Compound represented by a formula (1-5)

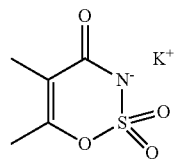
(1-5)

Ch K: Compound represented by a formula (2-6)

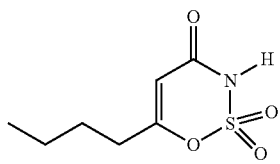
(2-6)

Ch L: Compound represented by a formula (2-7)

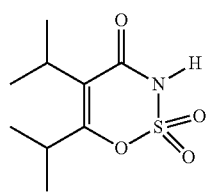
(2-7)

Ch M: Compound represented by a formula (2-8)

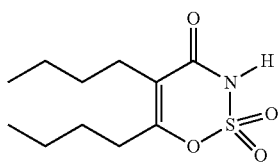
(2-8)

Ch N: Compound represented by a formula (3)

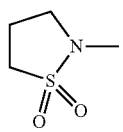
(3)

Example 1-1

Preparation of positive electrode according to an embodiment is provided. Lithium carbonate ($Li_2CO_3$) and cobalt carbonate ($CoCO_3$) were mixed in a molar ratio of 0.5:1 and then calcined at 900° C. for 5 hours in air to obtain lithium cobalt composite oxide ($LiCoO_2$).

Subsequently, a positive electrode mixture was formed by mixing 91 parts by mass of lithium cobalt composite oxide as a positive electrode active material, 6 parts by mass of graphite as a conductive agent, and 3 parts by mass of polyvinylidene fluoride as a binder, and then a paste-like positive electrode mixture slurry was prepared by dispersing N-methyl-2-pyrrolidone (NMP).

Finally, the positive electrode mixture slurry was applied onto both sides of a positive electrode current collector made of a belt-like aluminum foil (12 μm in thickness), and dried. Then, compression molding was performed by a roll-press machine to form a positive electrode active material layer. Thereafter, a positive electrode lead made of aluminum was attached to one end of the positive electrode current collector by welding.

Preparation of negative electrode according to an embodiment is provided. 96% by mass of a granular graphite powder having an average particle diameter of 15 μm as a negative electrode active material, 1.5% by mass of an acrylic acid modified product of a styrene-butadiene copolymer, 1.5% by mass of carboxymethyl cellulose, and an appropriate amount of water were stirred to prepare a negative electrode slurry.

Next, this negative electrode mixture slurry was uniformly applied onto both surfaces of a negative electrode current collector made of a belt-like copper foil having a thickness of 15 μm, dried, and compression molded to form a negative electrode active material layer. At that time, the amount of the positive electrode active material and the amount of the negative electrode active material were adjusted so that the open circuit voltage at the time of complete charge (that is, the battery voltage) was the voltage value shown in Table 1.

Preparation of separator according to an embodiment is provided. As a separator, a separator with a heat-resistant insulating layer in which insulating layers were formed on both sides of the following separator was used.

A polyvinylidene fluoride solution was prepared by dispersing alumina particles as ceramic particles (inorganic particles) of an insulating material in a ratio of polyvinylidene fluoride:alumina particles=20:80 (mass ratio). Next, a microporous polyethylene separator having a thickness of 12 μm was immersed in a polyvinylidene fluoride solution having alumina particles dispersed therein, then N-methyl-2-pyrrolidone was removed with water, and then the separator was dried with hot air at 80° C. Thus, an insulating layer with a thickness of 5 μm in total of both surfaces was formed on both surfaces of the microporous polyethylene separator to prepare a separator with a heat-resistant insulating layer.

Preparation of electrolytic solution according to an embodiment is provided. The electrolytic solution was prepared by dissolving 1.2 mol/kg of $LiPF_6$ as an electrolyte salt in a mixture composed of propylene carbonate and ethylmethyl carbonate in proportions of 5:95 (mass ratio) as a solvent, and adding Ch B as an additive in an amount of 1% by mass with respect to the whole electrolytic solution.

Assembling of battery according to an embodiment is provided. A positive electrode, a separator with a heat-resistant insulating layer, and a negative electrode were laminated to form a laminate, and the laminate was wound in the longitudinal direction to obtain an electrode wound body. The electrode wound body was sandwiched by an outer package film formed by sandwiching an aluminum foil between a pair of resin films, and the outer peripheral edge portion was thermally fused leaving one direction for filling of the electrolytic solution. After that, the electrolytic solution was filled in the outer package film, a remaining outer peripheral edge portion of the outer package film was thermally fused under a reduced pressure and sealed, and the electrode wound body was hermetically sealed in the outer package film. At this time, a portion to which the resin piece of the positive electrode terminal and the negative electrode terminal was applied was tucked into the sealing portion of the outer package film. In this way, a battery (laminated film type battery) was completed.

Examples 1-2 to Example 1-35

A battery was prepared in the same manner as in Example 1-1 except that the composition of the solvent of the electrolytic solution was changed as shown in Table 1.

Comparative Example 1-1 to Comparative Example 1-24

A battery was prepared in the same manner as in Example 1-1 except that at least one of the presence or absence of formation of the insulating layer, the composition of the solvent of the electrolytic solution, and the type and amount of the additive was changed as shown in Table 1. In the case of no insulating layer formation, a microporous polyethylene separator having a thickness of 12 μm was used in place of the separator with a heat-resistant insulating layer.

For the prepared batteries, the cycle characteristics described below were evaluated.

Evaluation of cycle characteristics according to an embodiment is provided. For the cycle characteristics, firstly, charge-discharge of three cycles were carried out at 30° C. In the charge-discharge up to the third cycle, charge was performed until the battery voltage reached a predetermined voltage (charging voltage shown in Table 1) at a constant current density of 1 mA/cm$^2$ and charge was performed until the current density reached 0.02 mA/cm$^2$ at a constant voltage of the predetermined voltage, and then the battery was charged at a constant current density of 1 mA/cm$^2$ until the battery voltage reached a predetermined voltage (2.5 V). Subsequently, the charge-discharge of fourth cycle was performed in which the battery was charged at a constant current density of 1 mA/cm$^2$ at 50° C. until the battery voltage reached a predetermined voltage (charge voltage shown in Table 1), and charged until the current density reached 0.02 mA/cm$^2$ at a constant voltage of the predetermined voltage, and then the battery was discharged at 50° C. At this time, discharge was carried out at a constant current density of 1 mA/cm$^2$ at 50° C. until the battery voltage reached a predetermined voltage (2.5 V). 100 cycles of charge-discharge were carried out under the same charge-discharge conditions, and the discharge capacity retention ratio (%) at the 104th cycle was obtained when the discharge capacity at the fourth cycle was taken as 100.

The results are shown in Table 1.

TABLE 1

| | Charge Voltage [V] | Insulating Layer | Composition of Solvent of Electrolytic Solution | | | | | | | Additive | | Discharge Capacity Retention Ratio [%] |
| | | | EC | PC | EMC | DMC | Propyl Propionate | Ethyl Propionate | γ-butyro-lactone | Type | Amount [% by mass] | |
|---|---|---|---|---|---|---|---|---|---|---|---|---|
| Example 1-1 | 4.4 | Present | — | 5 | 95 | — | — | — | — | Ch B | 1 | 69 |
| Example 1-2 | | | — | 25 | 75 | — | — | — | — | | | 66 |
| Example 1-3 | | | — | 50 | 50 | — | — | — | — | | | 65 |
| Example 1-4 | | | — | 75 | 25 | — | — | — | — | | | 63 |
| Example 1-5 | | | — | 100 | — | — | — | — | — | | | 57 |
| Example 1-6 | | | — | 5 | — | 95 | — | — | — | | | 70 |
| Example 1-7 | | | — | 25 | — | 75 | — | — | — | | | 67 |
| Example 1-8 | | | — | 50 | — | 50 | — | — | — | | | 65 |
| Example 1-9 | | | — | 75 | — | 25 | — | — | — | | | 62 |
| Example 1-10 | | | 20 | 5 | 75 | — | — | — | — | | | 78 |
| Example 1-11 | | | 5 | 20 | 75 | — | — | — | — | | | 74 |
| Example 1-12 | | | 45 | 5 | 50 | — | — | — | — | | | 76 |
| Example 1-13 | | | 25 | 25 | 50 | — | — | — | — | | | 73 |
| Example 1-14 | | | 5 | 45 | 50 | — | — | — | — | | | 71 |
| Example 1-15 | | | 33.3 | 33.3 | 33.4 | — | — | — | — | | | 72 |
| Example 1-16 | | | 70 | 5 | 25 | — | — | — | — | | | 77 |
| Example 1-17 | | | 50 | 25 | 25 | — | — | — | — | | | 72 |
| Example 1-18 | | | 37.5 | 37.5 | 25 | — | — | — | — | | | 72 |
| Example 1-19 | | | 25 | 50 | 25 | — | — | — | — | | | 68 |
| Example 1-20 | | | 5 | 70 | 25 | — | — | — | — | | | 65 |
| Example 1-21 | | | 85 | 5 | 10 | — | — | — | — | | | 76 |
| Example 1-22 | | | 70 | 20 | 10 | — | — | — | — | | | 72 |
| Example 1-23 | | | 45 | 45 | 10 | — | — | — | — | | | 70 |
| Example 1-24 | | | 20 | 70 | 10 | — | — | — | — | | | 64 |
| Example 1-25 | | | 5 | 85 | 10 | — | — | — | — | | | 60 |
| Example 1-26 | 4.4 | Present | 95 | 5 | — | — | — | — | — | Ch B | 1 | 74 |
| Example 1-27 | | | 85 | 15 | — | — | — | — | — | | | 72 |
| Example 1-28 | | | 75 | 25 | — | — | — | — | — | | | 70 |
| Example 1-29 | | | 50 | 50 | — | — | — | — | — | | | 68 |
| Example 1-30 | | | 25 | 75 | — | — | — | — | — | | | 63 |
| Example 1-31 | | | 15 | 85 | — | — | — | — | — | | | 59 |
| Example 1-32 | | | 5 | 95 | — | — | — | — | — | | | 57 |
| Example 1-33 | | | 37.5 | 37.5 | — | 25 | — | — | — | | | 70 |
| Example 1-34 | | | 37.5 | 37.5 | — | — | 25 | — | — | | | 71 |

TABLE 1-continued

|  |  |  | Composition of Solvent of Electrolytic Solution | | | | | | Additive | | Discharge Capacity |
| --- | --- | --- | --- | --- | --- | --- | --- | --- | --- | --- | --- |
|  | Charge Voltage [V] | Insulating Layer | EC | PC | EMC | DMC | Propyl Propionate | Ethyl Propionate | γ-butyro-lactone | Type | Amount [% by mass] | Retention Ratio [%] |
| Example 1-35 |  |  | 37.5 | 37.5 | — | — | — | — | 25 |  |  | 69 |
| Comparative Example 1-1 | 4.4 | Present | — | 5 | 95 | — | — | — | — | None | — | 45 |
| Comparative Example 1-2 |  | Present | — | 25 | 75 | — | — | — | — | None | — | 37 |
| Comparative Example 1-3 |  | Present | — | 50 | 50 | — | — | — | — | None | — | 28 |
| Comparative Example 1-4 |  | Present | — | 50 | 50 | — | — | — | — | Ch N | 1 | 31 |
| Comparative Example 1-5 |  | None | — | 50 | 50 | — | — | — | — | None | — | 30 |
| Comparative Example 1-6 |  | None | — | 50 | 50 | — | — | — | — | Ch N | 1 | 33 |
| Comparative Example 1-7 |  | None | — | 50 | 50 | — | — | — | — | Ch B | 1 | 39 |
| Comparative Example 1-8 |  | Present | — | 75 | 25 | — | — | — | — | None | — | 10 |
| Comparative Example 1-9 |  | Present | 75 | — | 25 | — | — | — | — | None | — | 36 |
| Comparative Example 1-10 |  | Present | 75 | — | 25 | — | — | — | — | Ch B | 1 | 38 |
| Comparative Example 1-11 | 4.4 | Present | 50 | — | 50 | — | — | — | — | None | — | 48 |
| Comparative Example 1-12 |  | Present | 50 | — | 50 | — | — | — | — | Ch B | 1 | 55 |
| Comparative Example 1-13 |  | Present | 49 | 1 | 50 | — | — | — | — | None | — | 43 |
| Comparative Example 1-14 |  | Present | 49 | 1 | 50 | — | — | — | — | Ch B | 1 | 52 |
| Comparative Example 1-15 |  | None | 45 | 5 | 50 | — | — | — | — | None | — | 43 |
| Comparative Example 1-16 |  | None | 45 | 5 | 50 | — | — | — | — | Ch N | 1 | 45 |
| Comparative Example 1-17 |  | None | 45 | 5 | 50 | — | — | — | — | Ch B | 1 | 47 |
| Comparative Example 1-18 |  | Present | 45 | 5 | 50 | — | — | — | — | None | — | 51 |
| Comparative Example 1-19 |  | Present | 45 | 5 | 50 | — | — | — | — | Ch N | 1 | 53 |
| Comparative Example 1-20 |  | None | 37.5 | 37.5 | 25 | — | — | — | — | None | — | 39 |
| Comparative Example 1-21 |  | None | 37.5 | 37.5 | 25 | — | — | — | — | Ch N | 1 | 42 |
| Comparative Example 1-22 |  | None | 37.5 | 37.5 | 25 | — | — | — | — | Ch B | 1 | 45 |
| Comparative Example 1-23 |  | Present | 5 | 45 | 50 | — | — | — | — | None | — | 32 |
| Comparative Example 1-24 |  | Present | 5 | 45 | 50 | — | — | — | — | Ch N | 1 | 35 |

The numerical value of the item of the composition of the solvent of the electrolytic solution is the mass percentage [mass %] with respect to the total mass of the nonaqueous solvent (this also applies to the following Tables 2 to 10).

As shown in Table 1, in Examples 1-1 to 1-35, the high-temperature cycle characteristics could be improved by having an insulating layer and by using the electrolytic solution which contains the nonaqueous solvent containing propylene carbonate in an amount of 5% by mass or more, and the Ch B as an additive.

Example 2-1 to Example 2-59

A battery was prepared in the same manner as in Example 1-18 except that the type and amount of the additive were changed as shown in Table 2.

Comparative Example 2-1 to Comparative Example 2-4

A battery was prepared in the same manner as in Example 2-1 except that the type and amount of the additive were changed as described in Table 2.

For the prepared batteries, the cycle characteristics were evaluated in the same manner as in Example 1-1. The results are shown in Table 2. The measurement results of Example 1-18, Comparative Example 1-9 to Comparative Example 1-10, and Comparative Example 1-20 to Comparative Example 1-22 are also shown in Table 2.

TABLE 2

| | Charge Voltage [V] | Insulating Layer | Composition of Solvent of Electrolytic Solution | | | Additive | | Discharge Capacity Retention Ratio [%] |
| | | | EC | PC | EMC | Type | Amount [% by mass] | |
|---|---|---|---|---|---|---|---|---|
| Example 2-1 | 4.4 | Present | 37.5 | 37.5 | 25 | Ch A | 0.01 | 52 |
| Example 2-2 | | Present | | | | | 0.1 | 57 |
| Example 2-3 | | Present | | | | | 1 | 61 |
| Example 2-4 | | Present | | | | | 3 | 61 |
| Example 2-5 | | Present | | | | | 5 | 56 |
| Example 2-6 | | Present | 37.5 | 37.5 | 25 | Ch B | 0.01 | 63 |
| Example 2-7 | | Present | | | | | 0.1 | 70 |
| Example 1-18 | | Present | | | | | 1 | 72 |
| Example 2-8 | | Present | | | | | 3 | 71 |
| Example 2-9 | | Present | | | | | 5 | 67 |
| Example 2-10 | | Present | 37.5 | 37.5 | 25 | Ch C | 0.01 | 59 |
| Example 2-11 | | Present | | | | | 0.1 | 65 |
| Example 2-12 | | Present | | | | | 1 | 68 |
| Example 2-13 | | Present | | | | | 3 | 68 |
| Example 2-14 | | Present | | | | | 5 | 63 |
| Example 2-15 | | Present | 37.5 | 37.5 | 25 | Ch D | 0.01 | 56 |
| Example 2-16 | | Present | | | | | 0.1 | 62 |
| Example 2-17 | | Present | | | | | 1 | 64 |
| Example 2-18 | | Present | | | | | 3 | 65 |
| Example 2-19 | | Present | | | | | 5 | 61 |
| Example 2-20 | | Present | 37.5 | 37.5 | 25 | Ch F | 0.01 | 54 |
| Example 2-21 | | Present | | | | | 0.1 | 61 |
| Example 2-22 | | Present | | | | | 1 | 63 |
| Example 2-23 | | Present | | | | | 3 | 64 |
| Example 2-24 | | Present | | | | | 5 | 60 |
| Example 2-25 | | Present | 37.5 | 37.5 | 25 | Ch G | 0.01 | 50 |
| Example 2-26 | | Present | | | | | 0.1 | 56 |
| Example 2-27 | | Present | | | | | 1 | 60 |
| Example 2-28 | | Present | | | | | 3 | 61 |
| Example 2-29 | | Present | | | | | 5 | 55 |
| Example 2-30 | | Present | 37.5 | 37.5 | 25 | Ch H | 0.01 | 51 |
| Example 2-31 | | Present | | | | | 0.1 | 57 |
| Example 2-32 | | Present | | | | | 1 | 60 |
| Example 2-33 | | Present | | | | | 3 | 61 |
| Example 2-34 | | Present | | | | | 5 | 56 |
| Example 2-35 | | Present | 37.5 | 37.5 | 25 | Ch I | 0.01 | 48 |
| Example 2-36 | | Present | | | | | 0.1 | 53 |
| Example 2-37 | | Present | | | | | 1 | 57 |
| Example 2-38 | | Present | | | | | 3 | 57 |
| Example 2-39 | | Present | | | | | 5 | 52 |
| Example 2-40 | | Present | 37.5 | 37.5 | 25 | Ch J | 0.01 | 54 |
| Example 2-41 | | Present | | | | | 0.1 | 60 |
| Example 2-42 | | Present | | | | | 1 | 63 |
| Example 2 43 | | Present | | | | | 3 | 63 |
| Example 2-44 | | Present | | | | | 5 | 59 |
| Example 2-45 | 4.4 | Present | 37.5 | 37.5 | 25 | Ch K | 0.01 | 47 |
| Example 2-46 | | Present | | | | | 0.1 | 51 |
| Example 2-47 | | Present | | | | | 1 | 55 |
| Example 2-48 | | Present | | | | | 3 | 54 |
| Example 2-49 | | Present | | | | | 5 | 50 |
| Example 2-50 | | Present | 37.5 | 37.5 | 25 | Ch L | 0.01 | 45 |
| Example 2-51 | | Present | | | | | 0.1 | 49 |
| Example 2-52 | | Present | | | | | 1 | 52 |

TABLE 2-continued

| | Charge Voltage [V] | Insulating Layer | Composition of Solvent of Electrolytic Solution | | | Additive | | Discharge Capacity Retention Ratio [%] |
| | | | EC | PC | EMC | Type | Amount [% by mass] | |
|---|---|---|---|---|---|---|---|---|
| Example 2-53 | | Present | | | | | 3 | 51 |
| Example 2-54 | | Present | | | | | 5 | 48 |
| Example 2-55 | | Present | 37.5 | 37.5 | 25 | Ch M | 0.01 | 45 |
| Example 2-56 | | Present | | | | | 0.1 | 50 |
| Example 2-57 | | Present | | | | | 1 | 51 |
| Example 2-58 | | Present | | | | | 3 | 51 |
| Example 2-59 | | Present | | | | | 5 | 48 |
| Comparative Example 2-1 | 4.4 | Present | 37.5 | 37.5 | 25 | None | — | 33 |
| Comparative Example 2-2 | | Present | 37.5 | 37.5 | 25 | Ch N | 0.01 | 35 |
| Comparative Example 2-3 | | Present | 37.5 | 37.5 | 25 | Ch N | 0.1 | 38 |
| Comparative Example 2-4 | | Present | 37.5 | 37.5 | 25 | Ch N | 1 | 40 |
| Comparative Example 1-9 | | Present | 75 | — | 25 | None | — | 36 |
| Comparative Example 1-10 | | Present | 75 | — | 25 | Ch B | 1 | 38 |
| Comparative Example 1-20 | | None | 37.5 | 37.5 | 25 | None | — | 39 |
| Comparative Example 1-21 | | None | 37.5 | 37.5 | 25 | Ch N | 1 | 42 |
| Comparative Example 1-22 | | None | 37.5 | 37.5 | 25 | Ch B | 1 | 45 |

As shown in Table 2, in Examples 2-1 to 2-59 and Example 1-18, the high-temperature cycle characteristics could be improved by having an insulating layer and by using the electrolytic solution which contains the nonaqueous solvent containing propylene carbonate in an amount of 5% by mass or more, and any one of Ch A to Ch D and Ch F to Ch M as an additive. When the amount of the additive was 0.1% by mass or more and 3% by mass or less, more excellent effects could be achieved.

Example 3-1 to Example 3-42

A battery was prepared in the same manner as in Example 2-3 except that the composition of the solvent of the electrolytic solution, and the type and amount of the additive were changed as shown in Table 3.

For the prepared batteries, the cycle characteristics were evaluated in the same manner as in Example 1-1. The measurement results are shown in Table 3. Measurement results of Example 2-3, Example 1-18, Example 2-17, Example 2-22, and Example 2-27 are also shown in Table 3.

TABLE 3

| | Charge Voltage [V] | Composition of Solvent of Electrolytic Solution | Additive | | Other Additive | | Discharge Capacity Retention Ratio [%] |
| | | | Type | Amount [% by mass] | Type | Amount [% by mass] | |
|---|---|---|---|---|---|---|---|
| Example 2-3 | 4.4 | EC:PC:EMC (=37.5:37.5:25) | Ch A | 1 | None | — | 61 |
| Example 3-1 | | | | | Succinonitrile | 1 | 58 |
| Example 3-2 | | | | | Adiponitrile | 1 | 60 |
| Example 3-3 | | | | | 1,3-propane sultone | 1 | 62 |
| Example 3-4 | | | | | 2-propynyl methanesulfonate | 1 | 63 |
| Example 3-5 | | | | | 1,3-dioxane | 1 | 61 |
| Example 3-6 | | | | | LiBF$_4$ | 1 | 62 |
| Example 3-7 | | | | | LiBOB | 1 | 62 |
| Example 3-8 | | | | | LiTFSA | 1 | 62 |
| Example 3-9 | | | | | Lithium difluorophosphate | 1 | 61 |
| Example 1-18 | | | Ch B | 1 | None | — | 72 |
| Example 3-9 | | | | | Succinonitrile | 1 | 70 |
| Example 3-10 | | | | | Adiponitrile | 1 | 71 |
| Example 3-11 | | | | | 1,3-propane sultone | 1 | 72 |
| Example 3-12 | | | | | 2-propynyl methanesulfonate | 1 | 73 |
| Example 3-13 | | | | | 1,3-dioxane | 1 | 72 |
| Example 3-14 | | | | | LiBF$_4$ | 1 | 73 |
| Example 3-15 | | | | | LiBOB | 1 | 73 |
| Example 3-16 | | | | | LiTFSA | 1 | 72 |
| Example 3-17 | | | | | Lithium difluorophosphate | 1 | 72 |
| Example 2-17 | | | Ch D | 1 | None | — | 64 |
| Example 3-17 | | | | | Succinonitrile | 1 | 60 |

TABLE 3-continued

| | Charge Voltage [V] | Composition of Solvent of Electrolytic Solution | Additive Type | Amount [% by mass] | Other Additive Type | Amount [% by mass] | Discharge Capacity Retention Ratio [%] |
|---|---|---|---|---|---|---|---|
| Example 3-18 | | | | | Adiponitrile | 1 | 61 |
| Example 3-19 | | | | | 1,3-propane sultone | 1 | 64 |
| Example 3-20 | | | | | 2-propynyl methanesulfonate | 1 | 65 |
| Example 3-21 | | | | | 1,3-dioxane | 1 | 65 |
| Example 3-22 | | | | | LiBF$_4$ | 1 | 64 |
| Example 3-23 | | | | | LiBOB | 1 | 65 |
| Example 3-24 | | | | | LiTFSA | 1 | 65 |
| Example 3-25 | | | | | Lithium difluorophosphate | 1 | 64 |
| Example 2-22 | 4.4 | EC:PC:EMC (=37.5:37.5:25) | Ch F | 1 | None | — | 63 |
| Example 3-25 | | | | | Succinonitrile | 1 | 60 |
| Example 3-26 | | | | | Adiponitrile | 1 | 62 |
| Example 3-27 | | | | | 1,3-propane sultone | 1 | 64 |
| Example 3-28 | | | | | 2-propynyl methanesulfonate | 1 | 64 |
| Example 3-29 | | | | | 1,3-dioxane | 1 | 63 |
| Example 3-30 | | | | | LiBF$_4$ | 1 | 64 |
| Example 3-31 | | | | | LiBOB | 1 | 63 |
| Example 3-32 | | | | | LiTFSA | 1 | 64 |
| Example 3-33 | | | | | Lithium difluorophosphate | 1 | 64 |
| Example 2-27 | | | Ch G | 1 | None | — | 60 |
| Example 3-34 | | | | | Succinonitrile | 1 | 57 |
| Example 3-35 | | | | | Adiponitrile | 1 | 59 |
| Example 3-36 | | | | | 1,3-propane sultone | 1 | 62 |
| Example 3-37 | | | | | 2-propynyl methanesulfonate | 1 | 63 |
| Example 3-38 | | | | | 1,3-dioxane | 1 | 61 |
| Example 3-39 | | | | | LiBF$_4$ | 1 | 61 |
| Example 3-40 | | | | | LiBOB | 1 | 61 |
| Example 3-41 | | | | | LiTFSA | 1 | 62 |
| Example 3-42 | | | | | lithium difluorophosphate | 1 | 61 |

As shown in Table 3, in Examples 3-1 to 3-42, even in the case of using various other additives and the like, the high-temperature cycle characteristics could be improved by having an insulating layer and by using the electrolytic solution which contains the nonaqueous solvent containing propylene carbonate in an amount of 5% by mass or more, and any one of Ch A, Ch B, Ch D, Ch F, and Ch G as an additive.

Example 4-1 to Example 4-60

A battery was prepared in the same manner as in Example 1-1 except that the composition of the solvent of the electrolytic solution, the type and amount of the additive, and the charge voltage were changed as shown in Table 4.

Comparative Example 4-1 to Comparative Example 4-9

A battery was prepared in the same manner as in Example 4-1 except that at least one of the presence or absence of formation of the insulating layer, the composition of the solvent of the electrolytic solution, and the type and amount of the additive was changed as shown in Table 4.

For the prepared batteries, the cycle characteristics were evaluated in the same manner as in Example 1-1. The results are shown in Table 4. The predetermined voltage at the time of charging is the voltage value shown in Table 4.

TABLE 4

| | Charge Voltage [V] | Insulating Layer | Composition of Solvent of Electrolytic Solution | | | Additive | Amount [% by mass] | Discharge Capacity Retention Ratio [%] |
|---|---|---|---|---|---|---|---|---|
| | | | EC | PC | EMC | Type | | |
| Example 4-1 | 4.2 | Present | 20 | 5 | 75 | Ch A | 0.01 | 77 |
| Example 4-2 | | Present | | | | | 0.1 | 82 |
| Example 4-3 | | Present | | | | | 1 | 87 |
| Example 4-4 | | Present | | | | | 3 | 86 |
| Example 4-5 | | Present | | | | | 5 | 81 |
| Example 4-6 | | Present | | | | Ch B | 0.01 | 85 |
| Example 4-7 | | Present | | | | | 0.1 | 94 |
| Example 4-8 | | Present | | | | | 1 | 96 |
| Example 4-9 | | Present | | | | | 3 | 97 |
| Example 4-10 | | Present | | | | | 5 | 91 |
| Example 4-11 | | Present | | | | Ch C | 0.01 | 82 |
| Example 4-12 | | Present | | | | | 0.1 | 92 |
| Example 4-13 | | Present | | | | | 1 | 95 |
| Example 4-14 | | Present | | | | | 3 | 95 |
| Example 4-15 | | Present | | | | | 5 | 90 |

TABLE 4-continued

|  | Charge Voltage [V] | Insulating Layer | Composition of Solvent of Electrolytic Solution | | | Additive | | Discharge Capacity Retention Ratio [%] |
|  |  |  | EC | PC | EMC | Type | Amount [% by mass] |  |
| --- | --- | --- | --- | --- | --- | --- | --- | --- |
| Example 4-16 |  | Present |  |  |  | Ch D | 0.01 | 80 |
| Example 4-17 |  | Present |  |  |  |  | 0.1 | 88 |
| Example 4-18 |  | Present |  |  |  |  | 1 | 91 |
| Example 4-19 |  | Present |  |  |  |  | 3 | 91 |
| Example 4-20 |  | Present |  |  |  |  | 5 | 87 |
| Example 4-21 |  | Present |  |  |  | Ch F | 0.01 | 78 |
| Example 4-22 |  | Present |  |  |  |  | 0.1 | 86 |
| Example 4-23 |  | Present |  |  |  |  | 1 | 88 |
| Example 4-24 |  | Present |  |  |  |  | 3 | 89 |
| Example 4-25 |  | Present |  |  |  |  | 5 | 84 |
| Example 4-26 |  | Present |  |  |  | Ch G | 0.01 | 77 |
| Example 4-27 |  | Present |  |  |  |  | 0.1 | 83 |
| Example 4-28 |  | Present |  |  |  |  | 1 | 87 |
| Example 4-29 |  | Present |  |  |  |  | 3 | 87 |
| Example 4-30 |  | Present |  |  |  |  | 5 | 82 |
| Example 4-31 |  | Present |  |  |  | Ch H | 0.01 | 76 |
| Example 4-32 |  | Present |  |  |  |  | 0.1 | 83 |
| Example 4-33 |  | Present |  |  |  |  | 1 | 86 |
| Example 4-34 |  | Present |  |  |  |  | 3 | 86 |
| Example 4-35 |  | Present |  |  |  |  | 5 | 81 |
| Example 4-36 |  | Present |  |  |  | Ch I | 0.01 | 75 |
| Example 4-37 |  | Present |  |  |  |  | 0.1 | 80 |
| Example 4-38 |  | Present |  |  |  |  | 1 | 82 |
| Example 4-39 |  | Present |  |  |  |  | 3 | 82 |
| Example 4-40 |  | Present |  |  |  |  | 5 | 79 |
| Example 4-41 | 4.2 | Present | 20 | 5 | 75 | Ch J | 0.01 | 78 |
| Example 4-42 |  | Present |  |  |  |  | 0.1 | 85 |
| Example 4-43 |  | Present |  |  |  |  | 1 | 89 |
| Example 4-44 |  | Present |  |  |  |  | 3 | 88 |
| Example 4-45 |  | Present |  |  |  |  | 5 | 83 |
| Example 4-46 |  | Present |  |  |  | Ch K | 0.01 | 74 |
| Example 4-47 |  | Present |  |  |  |  | 0.1 | 78 |
| Example 4-48 |  | Present |  |  |  |  | 1 | 80 |
| Example 4-49 |  | Present |  |  |  |  | 3 | 80 |
| Example 4-50 |  | Present |  |  |  |  | 5 | 77 |
| Example 4-51 |  | Present |  |  |  | Ch L | 0.01 | 72 |
| Example 4-52 |  | Present |  |  |  |  | 0.1 | 77 |
| Example 4-53 |  | Present |  |  |  |  | 1 | 78 |
| Example 4-54 |  | Present |  |  |  |  | 3 | 76 |
| Example 4-55 |  | Present |  |  |  |  | 5 | 75 |
| Example 4-56 |  | Present |  |  |  | Ch M | 0.01 | 72 |
| Example 4-57 |  | Present |  |  |  |  | 0.1 | 76 |
| Example 4-58 |  | Present |  |  |  |  | 1 | 77 |
| Example 4-59 |  | Present |  |  |  |  | 3 | 76 |
| Example 4-60 |  | Present |  |  |  |  | 5 | 74 |
| Comparative Example 4-1 | 4.2 | Present | 20 | 5 | 75 | None | — | 58 |
| Comparative Example 4-2 |  | Present | 20 | 5 | 75 | Ch N | 0.01 | 62 |
| Comparative Example 4-3 |  | Present | 20 | 5 | 75 | Ch N | 0.1 | 65 |
| Comparative Example 4-4 |  | Present | 20 | 5 | 75 | Ch N | 1 | 67 |
| Comparative Example 4-5 |  | Present | 25 | — | 75 | None | — | 65 |
| Comparative Example 4-6 |  | Present | 25 | — | 75 | Ch B | 1 | 70 |
| Comparative Example 4-7 |  | None | 20 | 5 | 75 | None | — | 62 |
| Comparative Example 4-8 |  | None | 20 | 5 | 75 | Ch N | 1 | 63 |
| Comparative Example 4-9 |  | None | 20 | 5 | 75 | Ch B | 1 | 66 |

As shown in Table 4, in the case of the charging voltage of 4.2 V, in Examples 4-1 to 4-60, the high-temperature cycle characteristics could be improved by having an insulating layer and by using the electrolytic solution which contains the nonaqueous solvent containing propylene carbonate in an amount of 5% by mass or more, and any one of Ch A to Ch D and Ch F to Ch M as an additive.

Example 5-1

A positive electrode and a negative electrode were prepared in the same manner as in Example 1-1.

A gel electrolyte layer containing alumina particles as ceramic particles of an insulating material was formed as an insulating layer on the prepared positive electrode and negative electrode according to an embodiment.

In order to form a gel electrolyte layer, first, polyvinylidene fluoride in which hexafluoropropylene is copolymerized in a ratio of 6.9 mass %, alumina particle powder having an average particle diameter of 0.3 µm, a nonaqueous electrolytic solution, and dimethyl carbonate are mixed, and the resulting mixture was stirred and dissolved to obtain a sol electrolyte solution.

Here, the nonaqueous electrolytic solution was formed by dissolving $LiPF_6$ in a mixed solvent of ethylene carbonate and propylene carbonate (mass ratio 1:1) at the rate of 1 mol/kg, and 0.01% by mass of Ch A was added as an additive.

Next, the obtained sol electrolyte solution was uniformly applied onto both surfaces of the positive electrode and the negative electrode. Thereafter, the electrolyte solution was dried to remove dimethyl carbonate. In this way, a gel electrolyte layer was formed on both surfaces of the positive electrode and the negative electrode.

Next, a belt-like positive electrode having gel electrolyte layers formed on both surfaces and a belt-like negative electrode having gel electrolyte layers formed on both surfaces, which were prepared as described above, were laminated to form a laminate. The laminate was wound in the longitudinal direction to obtain an electrode wound body. Finally, the electrode wound body was sandwiched by an outer package film formed by sandwiching an aluminum foil between a pair of resin films, the outer peripheral edge portion of the outer package film was thermally fused under a reduced pressure and sealed, and the electrode wound body was hermetically sealed in the outer package film. At this time, a portion to which the resin piece of the positive electrode terminal and the negative electrode terminal was applied was tucked into the sealing portion of the outer package film. In this way, a gel electrolyte battery was completed.

Example 5-2 to Example 5-25

A battery was prepared in the same manner as in Example 5-1 except that the composition of the solvent of the electrolytic solution, and the kind and amount of the additive were changed as shown in Table 5.

Comparative Example 5-1 to Comparative Example 5-9

A battery was prepared in the same manner as in Example 5-1 except that at least one of the presence or absence of formation of the insulating layer, the composition of the solvent of the electrolytic solution, and the type and amount of the additive was changed as shown in Table 5.

For the prepared batteries, the cycle characteristics were evaluated in the same manner as in Example 1-1. The measurement results are shown in Table 5. The predetermined voltage at the time of charging is a voltage value shown in Table 5.

TABLE 5

| | Charge Voltage [V] | Insulating Layer | Composition of Solvent of Electrolytic Solution | | Additive | | Discharge Capacity Retention Ratio [%] |
| | | | EC | PC | Type | Amount [% by mass] | |
| --- | --- | --- | --- | --- | --- | --- | --- |
| Example 5-1 | 4.4 | Present | 50 | 50 | Ch A | 0.01 | 48 |
| Example 5-2 | | Present | | | | 0.1 | 55 |
| Example 5-3 | | Present | | | | 1 | 57 |
| Example 5-4 | | Present | | | | 3 | 57 |
| Example 5-5 | | Present | | | | 5 | 54 |
| Example 5-6 | | Present | | | Ch B | 0.01 | 59 |
| Example 5-7 | | Present | | | | 0.1 | 66 |
| Example 5-8 | | Present | | | | 1 | 68 |
| Example 5-9 | | Present | | | | 3 | 67 |
| Example 5-10 | | Present | | | | 5 | 60 |
| Example 5-11 | | Present | | | Ch D | 0.01 | 52 |
| Example 5-12 | | Present | | | | 0.1 | 59 |
| Example 5-13 | | Present | | | | 1 | 62 |
| Example 5-14 | | Present | | | | 3 | 62 |
| Example 5-15 | | Present | | | | 5 | 58 |
| Example 5-16 | | Present | | | Ch F | 0.01 | 50 |
| Example 5-17 | | Present | | | | 0.1 | 56 |
| Example 5-18 | | Present | | | | 1 | 61 |
| Example 5-19 | | Present | | | | 3 | 60 |
| Example 5-20 | | Present | | | | 5 | 55 |
| Example 5-21 | | Present | | | Ch G | 0.01 | 46 |
| Example 5-22 | | Present | | | | 0.1 | 53 |
| Example 5-23 | | Present | | | | 1 | 56 |

TABLE 5-continued

| | Charge Voltage [V] | Insulating Layer | Composition of Solvent of Electrolytic Solution | | Additive | | Discharge Capacity Retention Ratio [%] |
| | | | EC | PC | Type | Amount [% by mass] | |
|---|---|---|---|---|---|---|---|
| Example 5-24 | | Present | | | | 3 | 57 |
| Example 5-25 | | Present | | | | 5 | 52 |
| Comparative Example 5-1 | 4.4 | Present | 50 | 50 | None | — | 28 |
| Comparative Example 5-2 | | Present | 50 | 50 | Ch N | 0.01 | 30 |
| Comparative Example 5-3 | | Present | 50 | 50 | Ch N | 0.1 | 33 |
| Comparative Example 5-4 | | Present | 50 | 50 | Ch N | 1 | 36 |
| Comparative Example 5-5 | | Present | 99 | 1 | None | — | 5 |
| Comparative Example 5-6 | | Present | 99 | 1 | Ch B | 1 | 10 |
| Comparative Example 5-7 | | None | 50 | 50 | None | — | 33 |
| Comparative Example 5-8 | | None | 50 | 50 | Ch N | 1 | 35 |
| Comparative Example 5-9 | | None | 50 | 50 | Ch B | 1 | 39 |

As shown in Table 5, in Examples 5-1 to 5-25, the high-temperature cycle characteristics could be improved by having an insulating layer and by using the electrolytic solution which contains the nonaqueous solvent containing propylene carbonate in an amount of 5% by mass or more, and any one of Ch A to Ch B, Ch D and Ch F to Ch G as an additive.

Example 6-1

The following negative electrode using silicon as a negative electrode active material was prepared. The amount of the positive electrode active material and the amount of the negative electrode active material were adjusted so that the charging voltage was 4.35 V. The composition of the solvent of the electrolytic solution was changed to ethylene carbonate:propylene carbonate:ethyl methyl carbonate=33.3:33.3:33.4 (mass ratio), and the additives and addition amounts were changed as shown in Table 6. A battery was prepared in the same manner as in Example 1-1 except for the above.

Preparation of negative electrode according to another embodiment is provided. Silicon powder having an average particle size of 5 μm was used as a negative electrode active material, and 90 parts by mass of the silicon powder, 5 parts by mass of the graphite powder, and 5 parts by mass of a polyimide precursor as a binder were mixed, and N-methyl-2-pyrrolidone was added to prepare a slurry. The resulting negative electrode mixture slurry was uniformly applied to both surfaces of a negative electrode current collector 22A made of a belt-like copper foil having a thickness of 15 μm, dried, compression molded, and heated at 400° C. for 12 hours in a vacuum atmosphere to form a negative electrode active material layer 22B.

Example 6-2 to Example 6-25

A battery was prepared in the same manner as in Example 6-1 except that the composition of the solvent of the electrolytic solution, and the type and the amount of the additive were changed as shown in Table 6.

Comparative Example 6-1 to Comparative Example 6-9

A battery was prepared in the same manner as in Example 6-1 except that the presence or absence of formation of the insulating layer, the composition of the solvent of the electrolytic solution, and the type and amount of the additive were changed as shown in Table 6.

For the prepared batteries, the cycle characteristics were evaluated in the same manner as in Example 1-1. The measurement results are shown in Table 6. The predetermined voltage at the time of charging is a voltage value shown in Table 6.

TABLE 6

| | Charge Voltage [V] | Insulating Layer | Composition of Solvent of Electrolytic Solution | | | Additive | Amount [% by mass] | Discharge Capacity Retention Ratio [%] |
| | | | EC | PC | EMC | | | |
|---|---|---|---|---|---|---|---|---|
| Example 6-1 | 4.35 | Present | 33.3 | 33.3 | 33.4 | Ch A | 0.01 | 34 |
| Example 6-2 | | Present | | | | | 0.1 | 46 |
| Example 6-3 | | Present | | | | | 1 | 50 |
| Example 6-4 | | Present | | | | | 3 | 49 |
| Example 6-5 | | Present | | | | | 5 | 44 |
| Example 6-6 | | Present | | | | Ch B | 0.01 | 40 |

TABLE 6-continued

| | Charge Voltage [V] | Insulating Layer | Composition of Solvent of Electrolytic Solution | | | | Amount [% by mass] | Discharge Capacity Retention Ratio [%] |
|---|---|---|---|---|---|---|---|---|
| | | | EC | PC | EMC | Additive | | |
| Example 6-7 | | Present | | | | | 0.1 | 59 |
| Example 6-8 | | Present | | | | | 1 | 62 |
| Example 6-9 | | Present | | | | | 3 | 61 |
| Example 6-10 | | Present | | | | | 5 | 58 |
| Example 6-11 | | Present | | | | Ch D | 0.01 | 38 |
| Example 6-12 | | Present | | | | | 0.1 | 55 |
| Example 6-13 | | Present | | | | | 1 | 58 |
| Example 6-14 | | Present | | | | | 3 | 58 |
| Example 6-15 | | Present | | | | | 5 | 53 |
| Example 6-16 | | Present | | | | Ch F | 0.01 | 36 |
| Example 6-17 | | Present | | | | | 0.1 | 50 |
| Example 6-18 | | Present | | | | | 1 | 53 |
| Example 6-19 | | Present | | | | | 3 | 53 |
| Example 6-20 | | Present | | | | | 5 | 48 |
| Example 6-21 | | Present | | | | Ch G | 0.01 | 33 |
| Example 6-22 | | Present | | | | | 0.1 | 45 |
| Example 6-23 | | Present | | | | | 1 | 48 |
| Example 6-24 | | Present | | | | | 3 | 49 |
| Example 6-25 | | Present | | | | | 5 | 44 |
| Comparative Example 6-1 | 4.35 | Present | 33.3 | 33.3 | 33.4 | None | — | 25 |
| Comparative Example 6-2 | | Present | 33.3 | 33.3 | 33.4 | Ch N | 0.01 | 26 |
| Comparative Example 6-3 | | Present | 33.3 | 33.3 | 33.4 | Ch N | 0.1 | 29 |
| Comparative Example 6-4 | | Present | 33.3 | 33.3 | 33.4 | Ch N | 1 | 30 |
| Comparative Example 6-5 | | Present | 66.6 | — | 33.4 | None | — | 28 |
| Comparative Example 6-6 | | Present | 66.6 | — | 33.4 | Ch B | 1 | 32 |
| Comparative Example 6-7 | | None | 33.3 | 33.3 | 33.4 | None | — | 26 |
| Comparative Example 6-8 | | None | 33.3 | 33.3 | 33.4 | Ch N | 1 | 29 |
| Comparative Example 6-9 | | None | 33.3 | 33.3 | 33.4 | Ch B | 1 | 31 |

As shown in Table 6, in Examples 6-1 to 6-25, the high-temperature cycle characteristics could be improved by having an insulating layer and by using the electrolytic solution which contains the nonaqueous solvent containing propylene carbonate in an amount of 5% by mass or more, and any one of Ch A to Ch B, Ch D and Ch F to Ch G as an additive.

Example 7-1

A positive electrode was prepared in which a type of the positive electrode active material was changed as follows. The amounts of the positive electrode active material and the negative electrode active material were adjusted so that the charging voltage was 4.6 V. The composition of the solvent of the electrolytic solution was changed to ethylene carbonate:propylene carbonate:ethyl methyl carbonate=25:25:50 (mass ratio), and the additives and addition amounts were changed as shown in Table 7. A battery was prepared in the same manner as in Example 1-1 except for the above.

Preparation of positive electrode active material according to an embodiment is provided. In order to obtain $Li_{1.13}(Mn_{0.6}Ni_{0.2}Co_{0.2})_{0.87}Al_{0.01}O_2$, nickel sulfate ($NiSO_4$), cobalt sulfate ($CoSO_4$), manganese sulfate ($MnSO_4$), and sodium aluminate ($NaAlO_2$) were mixed. In this case, the mixing ratio (molar ratio) was set to Mn:Ni:Co=60:20:20 and Al:(Mn+Ni+Co)=1:86. Subsequently, the mixture was dispersed in water, and sodium hydroxide (NaOH) was added thereto while adequately stirring to obtain a manganese.nickel.cobalt.aluminum composite coprecipitated hydroxide. Subsequently, the coprecipitate was washed with water and dried, and then lithium hydroxide monohydrate was added to obtain a precursor. In this case, the mixing ratio (molar ratio) was set to Li:(Mn+Ni+Co+Al)=113:87. Subsequently, the precursor was calcined at 800° C. for 10 hours in the air to obtain the intended positive electrode active material.

Example 7-2 to Example 7-25

A battery was prepared in the same manner as in Example 7-1 except that the composition of the solvent of the electrolytic solution, and the type and amount of the additive were changed as shown in Table 7.

Comparative Example 7-1 to Comparative Example 7-9

A battery was prepared in the same manner as in Example 7-1 except that at least one of the presence or absence of formation of the insulating layer, the composition of the solvent of the electrolytic solution, and the type and amount of the additive was changed as shown in Table 7.

For the prepared batteries, the cycle characteristics were evaluated in the same manner as in Example 1-1. The measurement results are shown in Table 7. The predetermined voltage at the time of charging is a voltage value shown in Table 7.

TABLE 7

| | Charge Voltage [V] | Insulating Layer | Composition of Solvent of Electrolytic Solution | | | Additive | | Discharge Capacity Retention Ratio [%] |
| | | | EC | PC | EMC | Type | Amount [% by mass] | |
|---|---|---|---|---|---|---|---|---|
| Example 7-1 | 4.6 | Present | 25 | 25 | 50 | Ch A | 0.01 | 42 |
| Example 7-2 | | Present | | | | | 0.1 | 50 |
| Example 7-3 | | Present | | | | | 1 | 53 |
| Example 7-4 | | Present | | | | | 3 | 53 |
| Example 7-5 | | Present | | | | | 5 | 47 |
| Example 7-6 | | Present | | | | Ch B | 0.01 | 50 |
| Example 7-7 | | Present | | | | | 0.1 | 63 |
| Example 7-8 | | Present | | | | | 1 | 65 |
| Example 7-9 | | Present | | | | | 3 | 66 |
| Example 7-10 | | Present | | | | | 5 | 62 |
| Example 7-11 | | Present | | | | Ch D | 0.01 | 47 |
| Example 7-12 | | Present | | | | | 0.1 | 57 |
| Example 7-13 | | Present | | | | | 1 | 59 |
| Example 7-14 | | Present | | | | | 3 | 60 |
| Example 7-15 | | Present | | | | | 5 | 56 |
| Example 7-16 | | Present | | | | Ch F | 0.01 | 45 |
| Example 7-17 | | Present | | | | | 0.1 | 54 |
| Example 7-18 | | Present | | | | | 1 | 56 |
| Example 7-19 | | Present | | | | | 3 | 56 |
| Example 7-20 | | Present | | | | | 5 | 53 |
| Example 7-21 | | Present | | | | Ch G | 0.01 | 42 |
| Example 7-22 | | Present | | | | | 0.1 | 50 |
| Example 7-23 | | Present | | | | | 1 | 52 |
| Example 7-24 | | Present | | | | | 3 | 52 |
| Example 7-25 | | Present | | | | | 5 | 46 |
| Comparative Example 7-1 | 4.6 | Present | 25 | 25 | 50 | None | — | 33 |
| Comparative Example 7-2 | | Present | 25 | 25 | 50 | Ch N | 0.01 | 34 |
| Comparative Example 7-3 | | Present | 25 | 25 | 50 | Ch N | 0.1 | 38 |
| Comparative Example 7-4 | | Present | 25 | 25 | 50 | Ch N | 1 | 40 |
| Comparative Example 7-5 | | Present | 50 | — | 50 | None | — | 37 |
| Comparative Example 7-6 | | Present | 50 | — | 50 | Ch B | 1 | 40 |
| Comparative Example 7-7 | | None | 25 | 25 | 50 | None | — | 30 |
| Comparative Example 7-8 | | None | 25 | 25 | 50 | Ch N | 1 | 32 |
| Comparative Example 7-9 | | None | 25 | 25 | 50 | Ch B | 1 | 38 |

As shown in Table 7, in Examples 7-1 to 7-25, in the case of the charging voltage of 4.6 V, the high-temperature cycle characteristics could be improved by having an insulating layer and by using the electrolytic solution which contains the nonaqueous solvent containing propylene carbonate in an amount of 5% by mass or more, and any one of Ch A to Ch B, Ch D and Ch F to Ch G as an additive.

Example 8-1

A positive electrode was prepared in which a type of the positive electrode active material was changed as follows. The amounts of the positive electrode active material and the negative electrode active material were adjusted so that the charging voltage was 4.95 V. The composition of the solvent of the electrolytic solution was changed to ethylene carbonate:propylene carbonate:diethyl carbonate=25:25:50 (mass ratio), and the additives and addition amounts were changed as shown in Table 8. A battery was prepared in the same manner as in Example 1-1 except for the above.

Preparation of positive electrode active material according to another embodiment is provided. Lithium carbonate ($Li_2CO_3$), manganese oxide ($MnO_2$), and nickel oxide (NiO) were weighed so as to have a predetermined molar ratio, and then mixed using a ball mill. Subsequently, the resulting mixture was calcined at 800° C. for 10 hours in air, and then cooled. Subsequently, the mixture was re-mixed using a ball mill and then calcined at 700° C. for 10 hours in the air to obtain a lithium nickel manganese composite oxide ($LiNi_{0.5}Mn_{1.5}O_4$) as a target positive electrode active material.

Examples 8-2 to Example 8-25

A battery was prepared in the same manner as in Example 8-1 except that the composition of the solvent of the electrolytic solution, and the type and amount of the additive were changed as shown in Table 8.

Comparative Example 8-1 to Comparative Example 8-9

A battery was prepared in the same manner as in Example 8-1 except that at least one of the presence or absence of formation of the insulating layer, the composition of the solvent of the electrolytic solution, and the type and amount of the additive was changed as shown in Table 8.

For the prepared batteries, the cycle characteristics were evaluated in the same manner as in Example 1-1. The measurement results are shown in Table 8. The predetermined voltage at the time of charging is a voltage value shown in Table 8.

layer. A battery was prepared in the same manner as in Example 1-1 except for the above.

A positive electrode was prepared in the same manner as in Example 1-1. 80 parts by mass of alumina particle powder as ceramic particles and 20 parts by mass of polyvinylidene fluoride (PVdF) as a binder were mixed and the resulting mixture was diluted with N-methyl-2-pyrrolidone solvent to prepare a mixed liquid. The positive electrode was immersed

TABLE 8

| | Charge Voltage [V] | Insulating Layer | Composition of Solvent of Electrolytic Solution | | | Additive | | Discharge Capacity Retention Ratio [%] |
| | | | EC | PC | DEC | Type | Amount [% by mass] | |
|---|---|---|---|---|---|---|---|---|
| Example 8-1 | 4.95 | Present | 25 | 25 | 50 | Ch A | 0.01 | 41 |
| Example 8-2 | | Present | | | | | 0.1 | 51 |
| Example 8-3 | | Present | | | | | 1 | 54 |
| Example 8-4 | | Present | | | | | 3 | 54 |
| Example 8-5 | | Present | | | | | 5 | 48 |
| Example 8-6 | | Present | | | | Ch B | 0.01 | 48 |
| Example 8-7 | | Present | | | | | 0.1 | 60 |
| Example 8-8 | | Present | | | | | 1 | 63 |
| Example 8-9 | | Present | | | | | 3 | 64 |
| Example 8-10 | | Present | | | | | 5 | 58 |
| Example 8-11 | | Present | | | | Ch D | 0.01 | 45 |
| Example 8-12 | | Present | | | | | 0.1 | 56 |
| Example 8-13 | | Present | | | | | 1 | 60 |
| Example 8-14 | | Present | | | | | 3 | 60 |
| Example 8-15 | | Present | | | | | 5 | 54 |
| Example 8-16 | | Present | | | | Ch F | 0.01 | 44 |
| Example 8-17 | | Present | | | | | 0.1 | 54 |
| Example 8-18 | | Present | | | | | 1 | 57 |
| Example 8-19 | | Present | | | | | 3 | 58 |
| Example 8-20 | | Present | | | | | 5 | 52 |
| Example 8-21 | | Present | | | | Ch G | 0.01 | 42 |
| Example 8-22 | | Present | | | | | 0.1 | 53 |
| Example 8-23 | | Present | | | | | 1 | 54 |
| Example 8-24 | | Present | | | | | 3 | 55 |
| Example 8-25 | | Present | | | | | 5 | 50 |
| Comparative Example 8-1 | 4.95 | Present | 25 | 25 | 50 | None | — | 32 |
| Comparative Example 8-2 | | Present | 25 | 25 | 50 | Ch N | 0.01 | 34 |
| Comparative Example 8-3 | | Present | 25 | 25 | 50 | Ch N | 0.1 | 38 |
| Comparative Example 8-4 | | Present | 25 | 25 | 50 | Ch N | 1 | 39 |
| Comparative Example 8-5 | 4.95 | Present | 50 | — | 50 | None | — | 33 |
| Comparative Example 8-6 | | Present | 50 | — | 50 | Ch B | 1 | 38 |
| Comparative Example 8-7 | | None | 25 | 25 | 50 | None | — | 28 |
| Comparative Example 8-8 | | None | 25 | 25 | 50 | Ch N | 1 | 33 |
| Comparative Example 8-9 | | None | 25 | 25 | 50 | Ch B | 1 | 40 |

* DEC: diethyl carbonate

As shown in Table 8, in the case of the charging voltage of 4.95 V, in Examples 8-1 to 8-25, the high-temperature cycle characteristics could be improved by having an insulating layer and by using the electrolytic solution which contains the nonaqueous solvent containing propylene carbonate in an amount of 5% by mass or more, and any one of Ch A to Ch B, Ch D and Ch F to Ch G as an additive.

Example 9-1

A positive electrode and an insulating layer were prepared as follows. A microporous polyethylene separator not having an insulating layer and having a thickness of 12 µm was used in place of the separator with a heat-resistant insulating layer. A battery was prepared in the same manner as in Example 1-1 except for the above.

A positive electrode was prepared in the same manner as in Example 1-1. 80 parts by mass of alumina particle powder as ceramic particles and 20 parts by mass of polyvinylidene fluoride (PVdF) as a binder were mixed and the resulting mixture was diluted with N-methyl-2-pyrrolidone solvent to prepare a mixed liquid. The positive electrode was immersed in the mixed liquid, and a film thickness was controlled with a gravure roller, and then the solvent was removed by passing the positive electrode through a dryer in an atmosphere of 120° C. to prepare a positive electrode 22 on which a porous film (insulating layer) with a thickness of 5 µm was formed. Thereafter, a positive electrode lead was attached to one end of the positive electrode current collector.

Example 9-2 to Example 9-12

A battery was prepared in the same manner as in Example 9-1 except that the composition of the solvent of the electrolytic solution, and the type and amount of the additive were changed as shown in Table 9

Comparative Example 9-1 to Comparative Example 9-6

A battery was prepared in the same manner as in Example 9-1 except that at least one of the presence or absence of formation of the insulating layer, the composition of the solvent of the electrolytic solution, and the type and amount of the additive was changed as shown in Table 9.

For the prepared batteries, the cycle characteristics were evaluated in the same manner as in Example 1-1. The measurement results are shown in Table 9.

TABLE 9

|  | Charge Voltage [V] | Insulating Layer | Composition of Solvent of Electrolytic Solution | | | Additive | | Discharge Capacity Retention Ratio [%] |
|  |  |  | EC | PC | DEC | Type | Amount [% by mass] |  |
| --- | --- | --- | --- | --- | --- | --- | --- | --- |
| Example 9-1 | 4.4 | Present | — | 25 | 75 | Ch A | 0.1 | 45 |
| Example 9-2 |  | Present | — |  |  |  | 1 | 50 |
| Example 9-3 |  | Present | — |  |  |  | 5 | 44 |
| Example 9-4 |  | Present | — |  |  | Ch B | 0.1 | 59 |
| Example 9-5 |  | Present | — |  |  |  | 1 | 62 |
| Example 9-6 |  | Present | — |  |  |  | 5 | 54 |
| Example 9-7 |  | Present | — |  |  | Ch D | 0.1 | 55 |
| Example 9-8 |  | Present | — |  |  |  | 1 | 56 |
| Example 9-9 |  | Present | — |  |  |  | 5 | 52 |
| Example 9-10 |  | Present | — |  |  | Ch E | 0.1 | 47 |
| Example 9-11 |  | Present | — |  |  |  | 1 | 52 |
| Example 9-12 |  | Present | — |  |  |  | 5 | 46 |
| Comparative Example 1-2 | 4.4 | Present | — | 25 | 75 | None | — | 37 |
| Comparative Example 9-1 |  | Present | — | 25 | 75 | Ch N | 1 | 41 |
| Comparative Example 9-2 |  | Present | 25 | — | 75 | None | — | 42 |
| Comparative Example 9-3 |  | Present | 25 | — | 75 | Ch B | 1 | 44 |
| Comparative Example 9-4 |  | None | — | 25 | 75 | None | — | 41 |
| Comparative Example 9-5 |  | None | — | 25 | 75 | Ch N | 1 | 42 |
| Comparative Example 9-6 |  | None | — | 25 | 75 | Ch B | 1 | 44 |

As shown in Table 9, in Examples 9-1 to 9-12, the high-temperature cycle characteristics could be improved by having an insulating layer formed on the positive electrode and by using the electrolytic solution which contains the nonaqueous solvent containing propylene carbonate in an amount of 5% by mass or more, and any one of Ch A to Ch E as an additive.

For the prepared batteries, the cycle characteristics were evaluated in the same manner as in Example 1-1. The measurement results are shown in Table 9.

Example 10-1

A negative electrode and an insulating layer were prepared as follows. A microporous polyethylene separator not having an insulating layer and having a thickness of 12 μm was used in place of the separator with a heat-resistant insulating layer. A battery was prepared in the same manner as in Example 1-1 except for the above.

A negative electrode was prepared in the same manner as in Example 1-1. 80 parts by mass of alumina particle powder as ceramic particles and 20 parts by mass of polyvinylidene fluoride (PVdF) as a binder were mixed and the resulting mixture was diluted with N-methyl-2-pyrrolidone solvent to prepare a mixed liquid. The negative electrode was immersed in the mixed liquid, and a film thickness was controlled with a gravure roller, and then the solvent was removed by passing a positive electrode plate through a dryer in an atmosphere of 120° C. to prepare a negative electrode on which a porous film (insulating layer) with a thickness of 5 μm was formed. Thereafter, a negative electrode lead made of nickel was attached to one end of the negative electrode current collector.

Example 10-2 to Example 10-12

A battery was prepared in the same manner as in Example 10-1 except that the composition of the solvent of the electrolytic solution, and the type and amount of the additive were changed as shown in Table 10.

Comparative Example 10-1 to Comparative Example 10-6

A battery was prepared in the same manner as in Example 10-1 except that at least one of the presence or absence of formation of the insulating layer, the composition of the solvent of the electrolytic solution, and the type and amount of the additive was changed as shown in Table 10.

For the prepared batteries, the cycle characteristics were evaluated in the same manner as in Example 1-1. The measurement results are shown in Table 10. The measurement results of Comparative Example 1-3, Comparative Example 1-5, and Comparative Example 1-11 are also shown in Table 10.

TABLE 10

| | Charge Voltage [V] | Insulating Layer | Composition of Solvent of Electrolytic Solution | | | Additive | | Discharge Capacity Retention Ratio [%] |
| --- | --- | --- | --- | --- | --- | --- | --- | --- |
| | | | EC | PC | DEC | Type | Amount [% by mass] | |
| Example 10-1 | 4.4 | Present | — | 50 | 50 | Ch A | 0.1 | 53 |
| Example 10-2 | | Present | — | | | | 1 | 55 |
| Example 10-3 | | Present | — | | | | 5 | 51 |
| Example 10-4 | | Present | — | | | Ch B | 0.1 | 57 |
| Example 10-5 | | Present | — | | | | 1 | 60 |
| Example 10-6 | | Present | — | | | | 5 | 56 |
| Example 10-7 | | Present | — | | | Ch D | 0.1 | 55 |
| Example 10-8 | | Present | — | | | | 1 | 59 |
| Example 10-9 | | Present | — | | | | 5 | 54 |
| Example 10-10 | | Present | — | | | Ch E | 0.1 | 54 |
| Example 10-11 | | Present | — | | | | 1 | 57 |
| Example 10-12 | | Present | — | | | | 5 | 52 |
| Comparative Example 1-3 | 4.4 | Present | — | 50 | 50 | None | — | 28 |
| Comparative Example 10-1 | | Present | — | 50 | 50 | Ch N | 1 | 41 |
| Comparative Example 1-11 | | Present | 50 | — | 50 | None | — | 48 |
| Comparative Example 10-2 | | Present | 50 | — | 50 | Ch B | 1 | 50 |
| Comparative Example 1-5 | | None | — | 50 | 50 | None | — | 30 |
| Comparative Example 10-2 | | None | — | 50 | 50 | Ch N | 1 | 34 |
| Comparative Example 10-3 | | None | — | 50 | 50 | Ch B | 1 | 38 |

As shown in Table 10, in Examples 10-1 to 10-12, the high-temperature cycle characteristics could be improved by having an insulating layer formed on the positive electrode and by using the electrolytic solution which contains the nonaqueous solvent containing propylene carbonate in an amount of 5% by mass or more, and any one of Ch A to Ch E as an additive.

Although the present technology has been described with reference to each embodiment and example, the present technology is not limited to these, and various variations may be made without departing from the gist of the present technology.

For example, numerical values, structures, shapes, materials, raw materials, manufacturing processes, and the like mentioned in the above embodiments and examples are merely examples, and different numerical values, structures, shapes, materials, raw materials, manufacturing processes or the like may be used as required.

The configurations, methods, steps, shapes, materials, numerical values, and the like in the above-mentioned embodiments and examples may be combined with each other without departing from the gist of the present technology.

The battery according to the present technology can be similarly applied to a case having another battery structure such as a prismatic shape. In the embodiments as described herein, a laminated electrode body may be used in place of the wound electrode body. The battery according to the present technology can also be applied to, for example, a flexible battery mounted on a wearable terminal such as smart watch, head mounted display, iGlass (registered trademark) or the like. The battery according to the present technology can also be applied to a battery mounted on an aircraft, a flying object such as an unmanned aerial vehicle, or the like.

The present technology is described below in further detail according to an embodiment.

[1]

A battery including:

an electrode group including a positive electrode and a negative electrode; and an electrolyte including an electrolytic solution, wherein the electrode group includes an insulating layer having an insulating material, and the electrolytic solution contains a nonaqueous solvent containing propylene carbonate in an amount of 5% by mass or more and an additive composed of at least one of the compounds represented by a formula (1) to a formula (2).

[Formula 1]

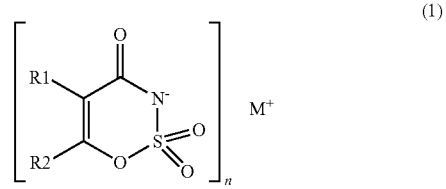

In the above formula, R1 and R2 each independently represent a hydrogen group, an alkyl group, an alkenyl group or an alkynyl group optionally having a substituent and having 1 to 4 carbon atoms, n is an integer of 1 to 3, and M is a metal ion.

[Formula 2]

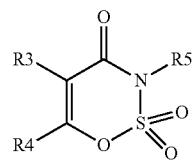

In the above formula, R3, R4 and R5 each independently represent a hydrogen group, an alkyl group, an alkenyl group or an alkynyl group optionally having a substituent and having 1 to 4 carbon atoms.

[2]
The battery according to the above [1], wherein a content of the additive is 0.01% by mass or more and 5% by mass or less.

[3]
The battery according to any one of the above [1] to [2], wherein the insulating material is an insulating particle.

[4]
The battery according to the above [3], wherein the insulating particle includes an inorganic particle.

[5]
The battery according to any one of the above [1] to [4], wherein the insulating layer is disposed between the positive electrode and the negative electrode.

[6]
The battery according to any one of the above [1] to [5], wherein
the electrode group further includes a separator disposed between the positive electrode and the negative electrode, and the insulating layer is disposed at least one of between the separator and the positive electrode and between the separator and the negative electrode.

[7]
The battery according to any one of the above [1] to [6], wherein a negative electrode active material layer contains, as a negative electrode active material, at least one of a single substance, an alloy and a compound of silicon.

[8]
The battery according to any one of the above [1] to [7], wherein the electrolytic solution contains at least one of a dinitrile compound, a cyclic sulfonic acid ester, a chain sulfonic acid ester, a cyclic ether, lithium tetrafluoroborate, lithium difluorophosphate, lithium difluoro(oxalato)borate and lithium bis(trifluoromethanesulfonyl)imide.

[9]
The battery according to any one of the above [1] to [8], wherein a nonaqueous electrolyte further contains a polymer compound which holds the electrolytic solution.

[10]
The battery according to any one of the above [1] to [9], wherein an open circuit voltage in the fully charged state per a pair of the positive electrode and the negative electrode is 4.40 V or more and 6.00 V or less.

[11]
A battery including:
an electrode group including a positive electrode and a negative electrode; and
an electrolyte including an electrolytic solution, a polymer compound which holds the electrolytic solution and an insulating material,
wherein
the electrolytic solution contains a nonaqueous solvent containing propylene carbonate in an amount of 5% by mass or more and an additive composed of at least one of the compounds represented by a formula (1) to a formula (2).

[12]
A battery pack including:
the battery according to any one of the above [1] to [11], and a control part that controls the battery.

[13]
An electronic device which receives supply of electric power from the battery according to any one of the above [1] to [11].

[14]
An electric vehicle including:
the battery according to any one of the above [1] to [11], a converting device that receives supply of electric power from the battery and converts the electric power into a driving force of a vehicle; and
a control device that performs information processing on vehicle control based on information on the battery.

[15]
An electric storage device including the battery according to any one of the above [1] to [11], wherein the electric storage device supplies electric power to an electronic device connected to the battery.

[16]
The electric storage device according to the above 15, Wherein
the electric storage device includes an electric power information control device which transmits and receives signals to and from another device via a network, and
charge-discharge control of the battery is performed based on information received by the electric power information control device.

[17]
An electric power system which receives supply of electric power from the battery according to any one of the above [1] to [11].

[18]
The electric power system according to the above [17], wherein electric power is supplied to the battery from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery comprising:
an electrode group including a positive electrode and a negative electrode; and
an electrolyte including an electrolytic solution,
wherein the electrode group includes an insulating layer having an insulating material, and
wherein the electrolytic solution includes a nonaqueous solvent including propylene carbonate in an amount of 5% by mass or more and an additive including one or more compounds represented by a chemical formula (1),

[Chemical Formula 1]

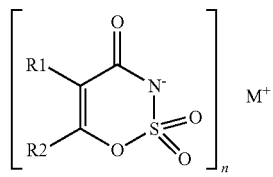
(1)

wherein R1 and R2 each independently represent an alkyl group, an alkenyl group or an alkynyl group, where the alkyl group, the alkenyl group, and the alkynyl group each having 1 to 4 carbon atoms, n is an integer of 1 to 3, and M is a metal ion.

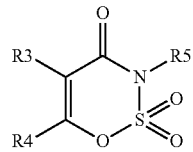
(2)

2. The battery according to claim 1, wherein a content of the additive is 0.01% by mass or more and 5% by mass or less.

3. The battery according to claim 1, wherein the insulating material includes an insulating particle.

4. The battery according to claim 3, wherein the insulating particle includes an inorganic particle.

5. The battery according to claim 1, wherein the insulating layer is provided between the positive electrode and the negative electrode.

6. The battery according to claim 1,
wherein the electrode group further includes a separator provided between the positive electrode and the negative electrode, and
wherein the insulating layer is provided between the separator and the positive electrode or between the separator and the negative electrode.

7. The battery according to claim 1, wherein the negative electrode includes a negative electrode active material layer including at least one of a single substance of silicon, an alloy of silicon, and a compound of silicon.

8. The battery according to claim 1, wherein the electrolytic solution includes at least one selected from the group consisting of a dinitrile compound, a cyclic sulfonic acid ester, a chain sulfonic acid ester, a cyclic ether, lithium tetrafluoroborate, lithium difluorophosphate, lithium difluoro(oxalato)borate, and lithium bis(trifluoromethanesulfonyl) imide.

9. The battery according to claim 1, wherein the electrolyte further includes a polymer compound configured to hold the electrolytic solution.

10. The battery according to claim 1, wherein an open circuit voltage in a fully charged state per a pair of the positive electrode and the negative electrode is 4.40 V or more and 6.00 V or less.

11. The battery according to claim 1, wherein the alkyl group, the alkenyl group, and the alkynyl group each having a substituent.

12. The battery according to claim 1, wherein the additive further includes one or more compounds represented by a chemical formula (2):

[Chemical Formula 2]

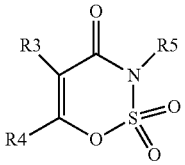
(2)

wherein R3, R4 and R5 each independently represent a hydrogen group, an alkyl group, an alkenyl group or an alkynyl group, where the alkyl group, the alkenyl group, and the alkynyl group each having 1 to 4 carbon atoms.

13. A battery comprising:
an electrode group including a positive electrode and a negative electrode; and
an electrolyte including an electrolytic solution, a polymer compound configured to hold the electrolytic solution, and an insulating material,
wherein
the electrolytic solution includes a nonaqueous solvent including propylene carbonate in an amount of 5% by mass or more and an additive including one or more compounds represented by a chemical formula (1),

[Chemical Formula 1]

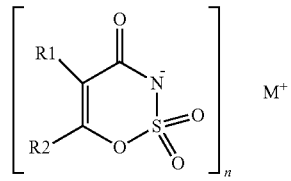
(1)

wherein R1 and R2 each independently represent an alkyl group, an alkenyl group or an alkynyl group, where the alkyl group, the alkenyl group, and the alkynl group each having 1 to 4 carbon atoms, n is an integer of 1 to 3, and M is a metal ion.

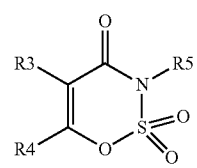
(2)

14. The battery according to claim 13, wherein the alkyl group, the alkenyl group, and the alkynyl group each having a substituent.

15. The battery according to claim 13, wherein the additive further includes one or more compounds represented by a chemical formula (2):

[Chemical Formula 2]

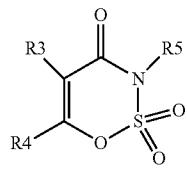

(2)

wherein R3, R4 and R5 each independently represent a hydrogen group, an alkyl group, an alkenyl group or an alkynyl group, where the alkyl group, the alkenyl group, and the alkynyl group each having 1 to 4 carbon atoms.

16. A battery pack comprising:
the battery according to claim 1; and
a control circuit configured to control the battery.

17. An electronic device configured to receive supply of electric power from the battery according claim 1.

18. An electric vehicle comprising:
the battery according to claim 1;
a converting device configured to receive supply of electric power from the battery and converts the electric power into a driving force of a vehicle; and
a control device configured to perform information processing on vehicle control based on information on the battery.

19. An electric storage device comprising the battery according to claim 1, wherein the electric storage device is configured to supply electric power to an electronic device connected to the battery.

20. The electric storage device according to claim 19, wherein the electric storage device includes an electric power information control device configured to transmit and receive signals to and from another device via a network, and
wherein charge-discharge control of the battery is performed based on information received by the electric power information control device.

21. An electric power system configured to receive supply of electric power from the battery according to claim 1.

22. The electric power system according to claim 19, wherein electric power is supplied to the battery from a power generation device or a power network.

* * * * *